US008867077B2

(12) United States Patent
Kobayashi

(10) Patent No.: US 8,867,077 B2
(45) Date of Patent: Oct. 21, 2014

(54) INFORMATION PROCESSING APPARATUS, SYSTEM

(71) Applicant: Hiroto Kobayashi, Saitama (JP)

(72) Inventor: Hiroto Kobayashi, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 193 days.

(21) Appl. No.: 13/647,657

(22) Filed: Oct. 9, 2012

(65) Prior Publication Data
US 2013/0094056 A1 Apr. 18, 2013

(30) Foreign Application Priority Data

Oct. 13, 2011 (JP) ................... 2011-226153

(51) Int. Cl.
G06F 3/12 (2006.01)
(52) U.S. Cl.
CPC ............ G06F 3/1208 (2013.01); G06F 3/1253 (2013.01); G06F 3/1288 (2013.01); G06F 3/1247 (2013.01)
USPC .......................... 358/1.15; 358/1.13; 358/1.14
(58) Field of Classification Search
CPC ... G06F 3/1253; G06F 3/1285; G06F 21/305; G06F 3/1256; H04N 1/00917
USPC ........................ 358/1.13, 1.14, 1.15
See application file for complete search history.

(56) References Cited

U.S. PATENT DOCUMENTS 7,333,221 B2* 2/2008 Okajima ...................... 358/1.13
7,456,980 B2* 11/2008 Kuboki ........................ 358/1.13
7,707,325 B2 4/2010 Kawasaki
7,856,202 B2* 12/2010 Mizobuchi et al. ........... 399/389
7,952,731 B2* 5/2011 Utsunomiya et al. ........ 358/1.13
2005/0073708 A1* 4/2005 Oh et al. ....................... 358/1.13
2005/0134891 A1* 6/2005 Ishizaki ........................ 358/1.13
2007/0043805 A1* 2/2007 Izaki et al. .................... 709/201
2010/0302589 A1 12/2010 Kobayashi
2011/0058199 A1 3/2011 Kobayashi
2011/0249283 A1* 10/2011 Okada et al. ................... 358/1.9
2011/0286036 A1 11/2011 Kobayashi
2012/0140269 A1 6/2012 Kobayashi
2012/0212769 A1* 8/2012 Gaertner et al. ............. 358/1.15

FOREIGN PATENT DOCUMENTS

JP 2007-011469 1/2007
JP 2007-122473 5/2007
JP 2010-066876 3/2010

* cited by examiner

Primary Examiner — Dennis Dicker
(74) Attorney, Agent, or Firm — Harness, Dickey & Pierce, P.L.C.

(57) ABSTRACT

An information processing apparatus includes an operation receiving unit for receiving an operation; a setting receiving unit for displaying a setting condition for printing or transmission and receiving a change to the setting condition, after the operation receiving unit receives an instruction to start printing or transmitting; and a storage unit in which the setting condition is stored by the setting receiving unit via an operating system by using, as a key, identification information acquired by the setting receiving unit, the identification information identifying a printing or transmission process and being generated by the operating system according to the instruction to start printing or transmitting. An image processing unit acquires the identification information from the operating system, and reads, from the storage unit, the setting condition using the identification information as a key, and converts document data into print data of a printing device based on the setting condition.

12 Claims, 30 Drawing Sheets

| INSTALL ENVIRONMENT | | SPOOL FORMAT | RENDERING LOCATION | WHETHER POSSIBLE IN CONVENTIONAL TECHNOLOGY |
|---|---|---|---|---|
| LOCAL | | RAW | LOCAL | ○ |
| | | EMF | LOCAL | × |
| Point&Print | | RAW | CLIENT | ○ |
| | | EMF | CLIENT | ○ |
| | | | SERVER | × |

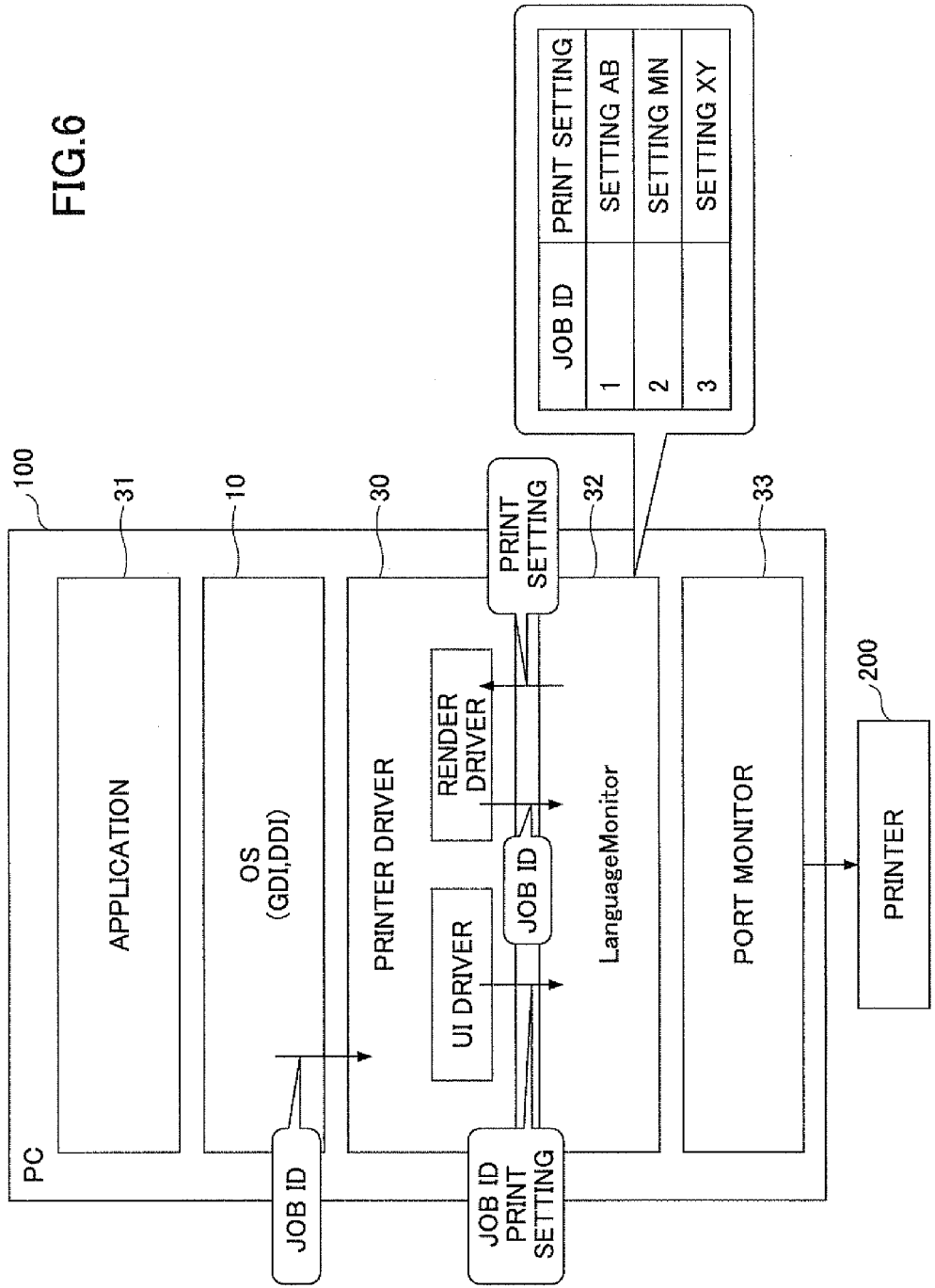

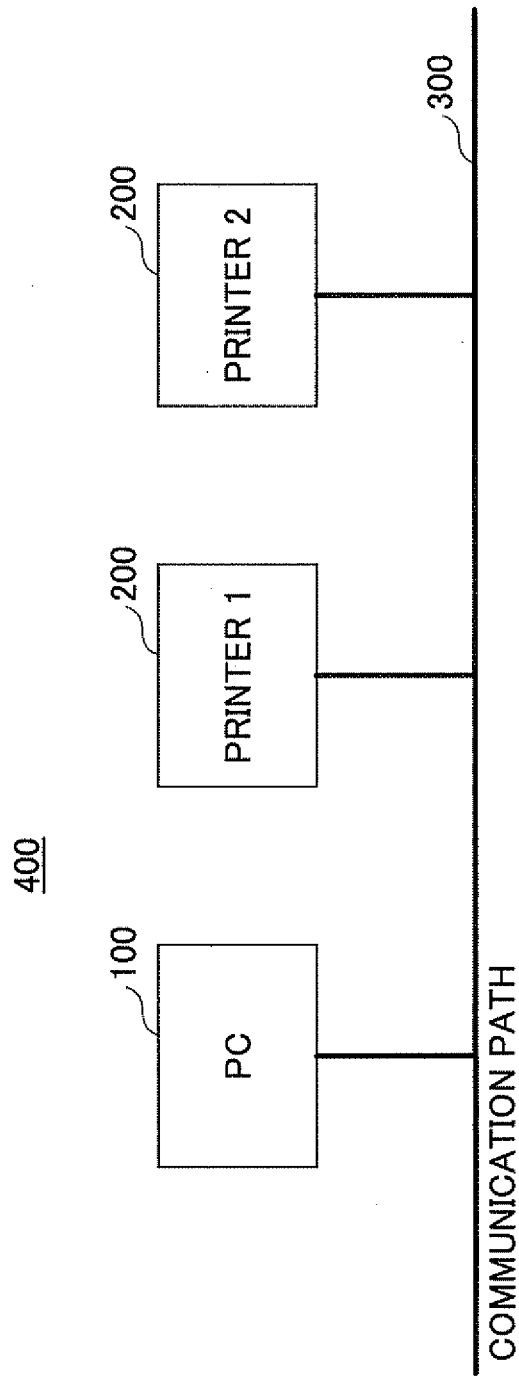

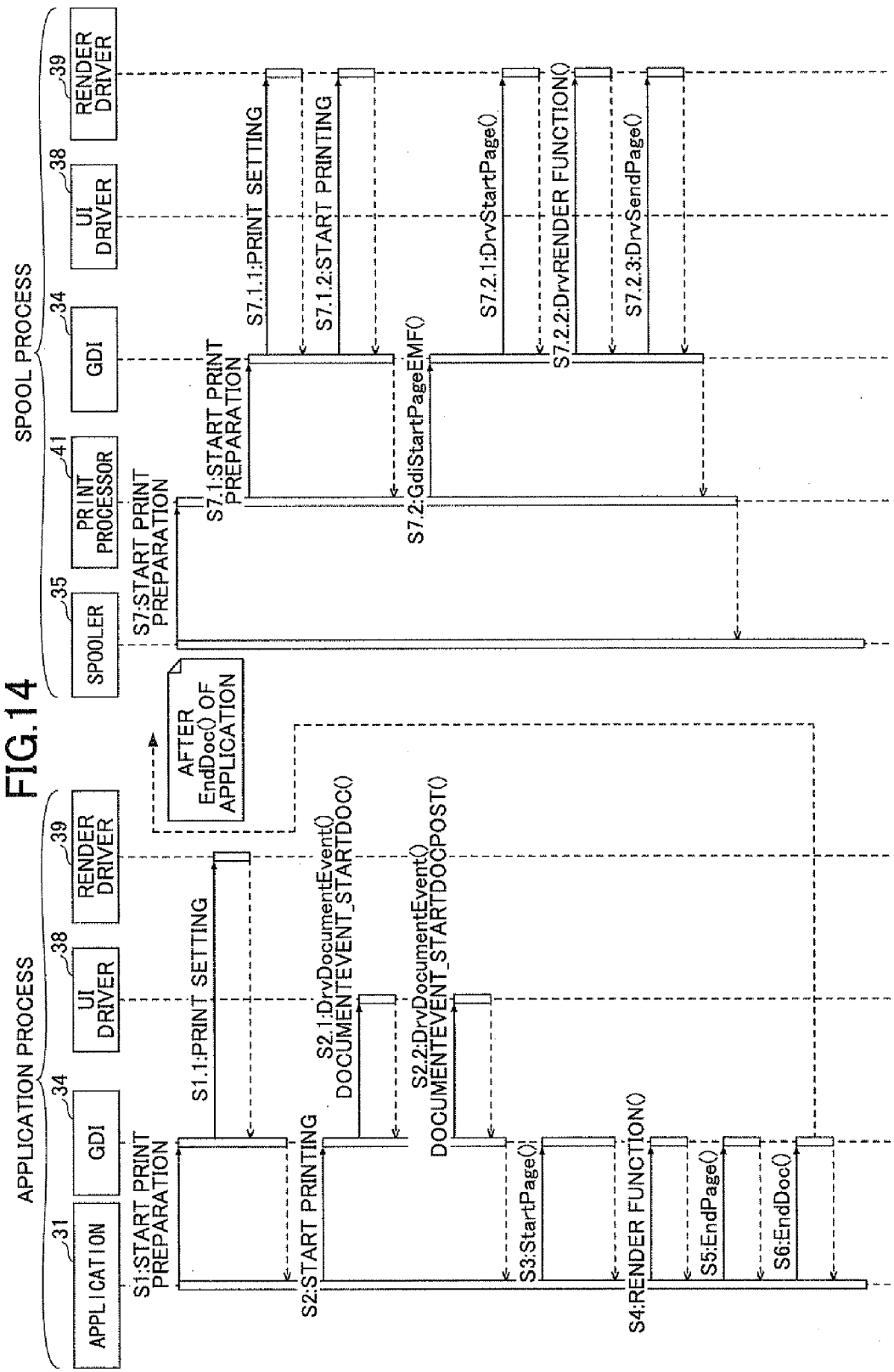

FIG.15A

```
int ExtEscape(
    HDC hdc,                  // handle to DC
    int nEscape,              // escape function
    int cbInput,              // size of input structure
    LPCSTR lpszInData,        //input structure
    int cbOutput,             // size of output structure
    LPSTR lpszOutData,        //output structure
);
```

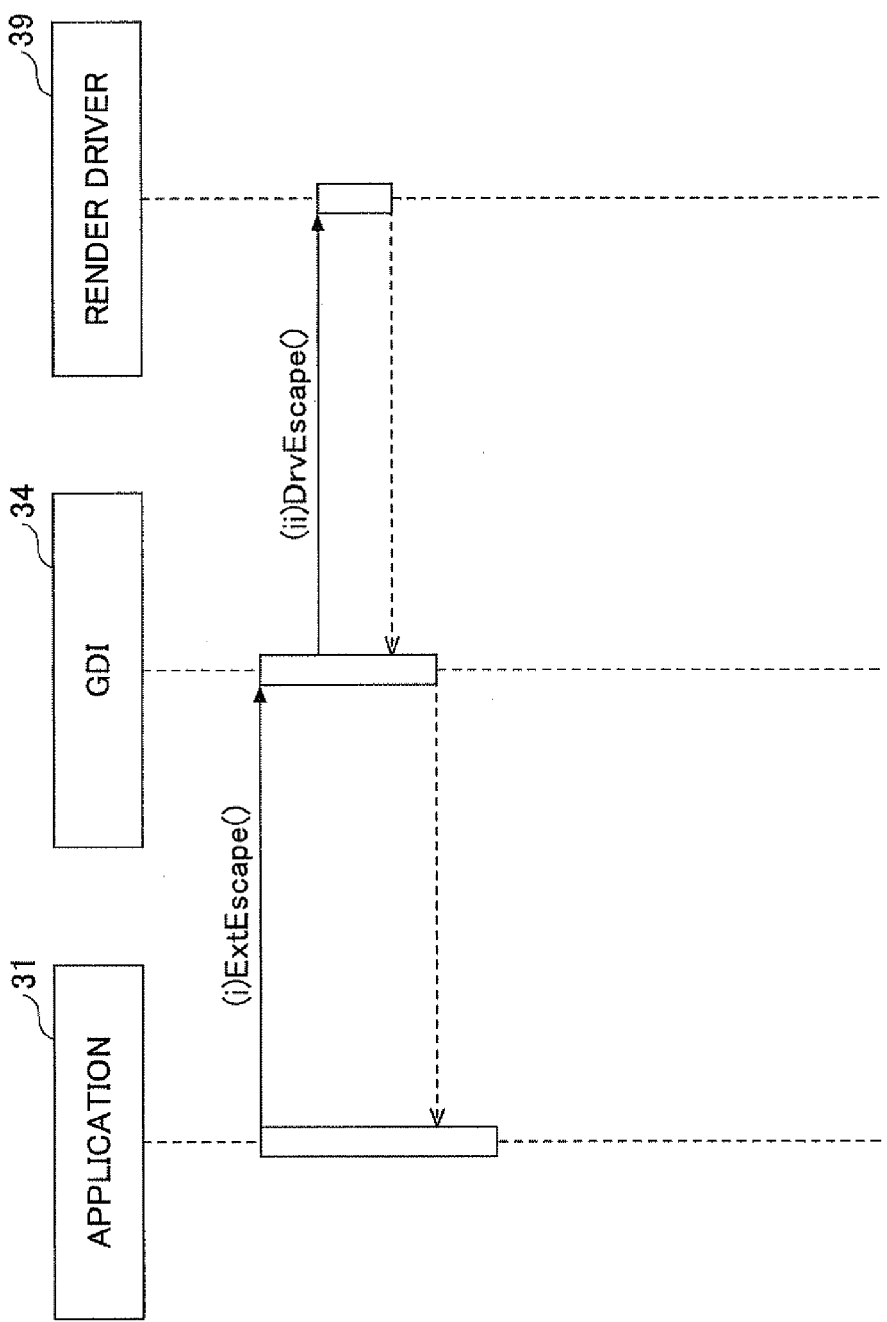

```
INT
DrvDocumentEvent(
    HANDLE  hPrinter,
    HDC     hdc,
    int     iEsc,
    ULONG   cbIn,
    PVOID   pvIn,
    ULONG   cbOut,
    PVOID   pvOut
);
```

FIG.16A

```
DWORD WINAPI
SendRecvBidiDataFromPort(
    HANDLE hport,
    DWORD dwAccessBit,
    LPCWSTR pAction,
    PBIDI_REQUEST_CONTAINER pReqData,
    PBIDI_RESPONSE_CONTAINER *ppResData
);
```

FIG.16B

```
typedef struct _BIDI_REQUEST_CONTAINER {
    DWORD   Version;
    DWORD   Flags;
    DWORD   Count;
    BIDI_REQUEST_DATA aData[1];
} BIDI_REQUEST_CONTAINER, *PBIDI_REQUEST_CONTAINER,
  *LPBIDI_REQUEST_CONTAINER;
```

FIG.17A

```
typedef struct _BIDI_REQUEST_DATA {
    DWORD   dwReqNumber;
    LPWSTR  pSchema;
    BIDI_DATA data;
} BIDI_REQUEST_DATA, *PBIDI_REQUEST_DATA, *LPBIDI_REQUEST_DATA;
```

FIG.17B

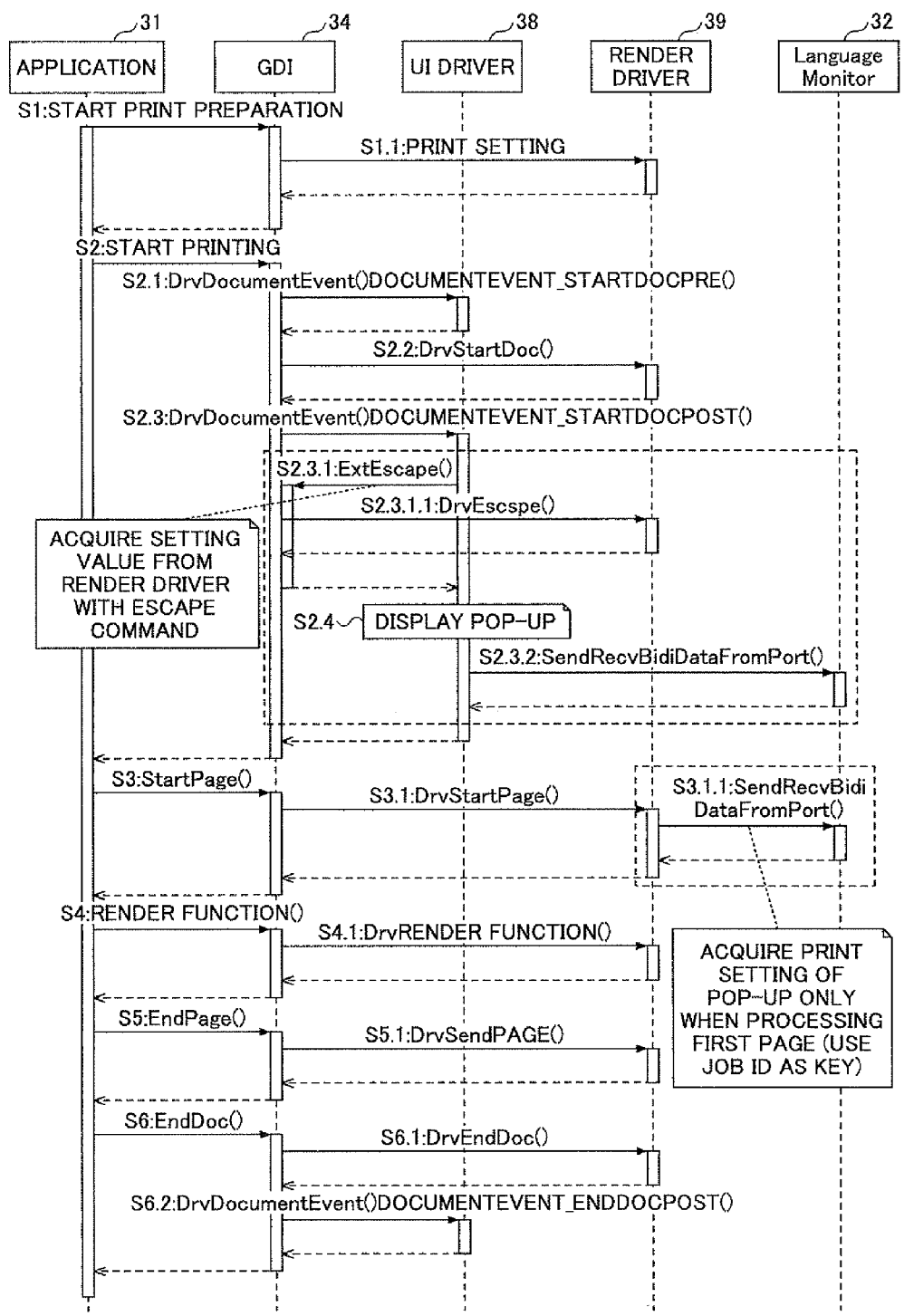

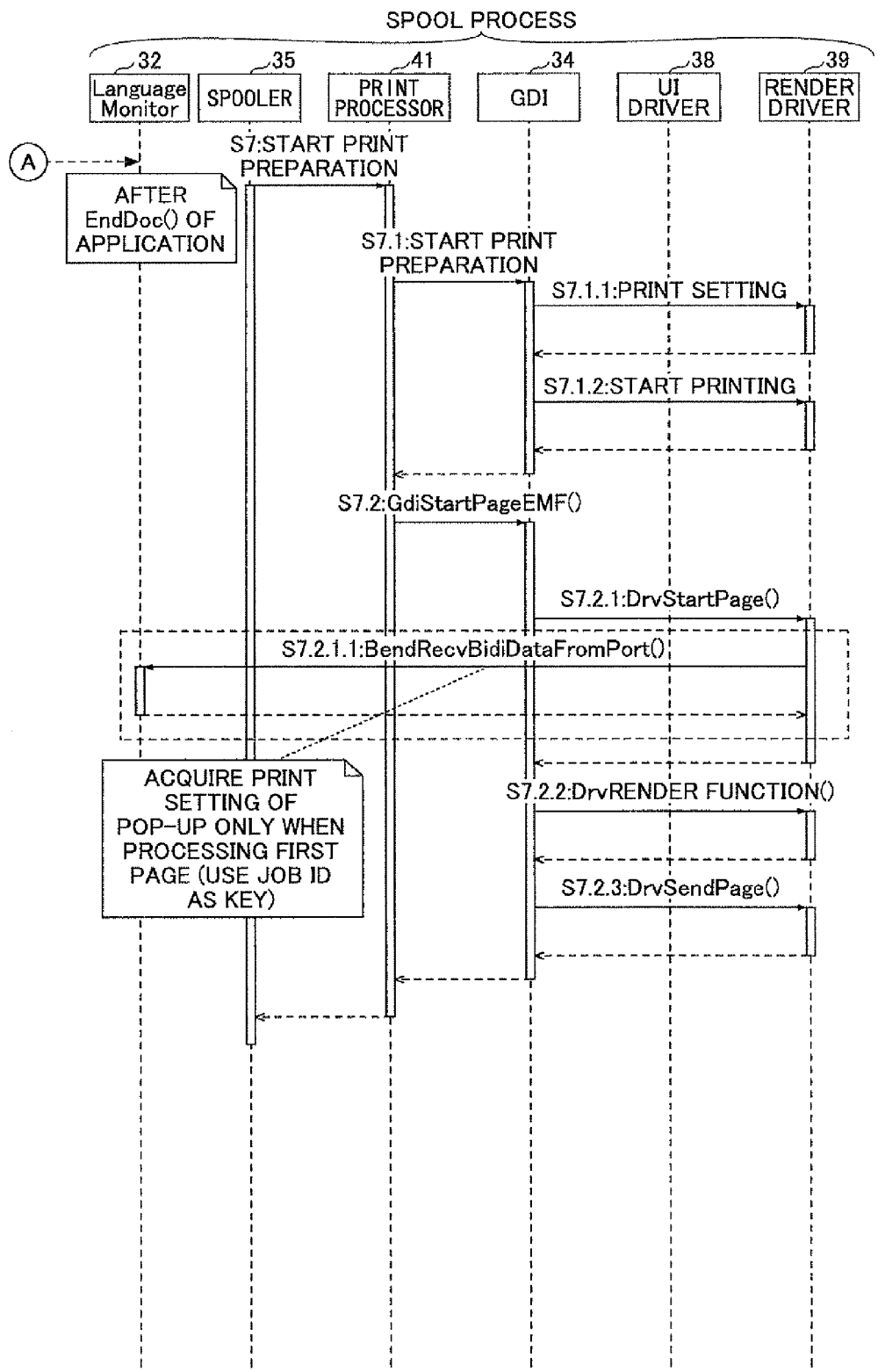

INFORMATION PROCESSING APPARATUS, SYSTEM

BACKGROUND OF THE INVENTION

1. Field of the Invention

The present invention relates to an information processing apparatus for acquiring document data to be printed or transmitted, and sending the acquired document data to a printing device.

2. Description of the Related Art

A user frequently executes various application programs (hereinafter, simply referred to as "applications") such as document creating software, spreadsheet software, and image editing software with a computer, and performs printing and fax transmission. In these cases, a driver (program) is executed for controlling a printing device and a fax device on an operating system (OS) so that processes necessary for controlling the printing device and fax device are separated from the application.

Printing and fax transmission by a printer driver and a PC-FAX driver are performed by the following procedures.

1. A user displays a print setting screen from a printing menu of an application, and determines print settings.
2. The user gives an instruction to start printing to the application.

The printer driver receives, at 2., the print settings determined at 1., and converts the document data received from the application into print data that can be interpreted by the printer, based on the print settings. The printer acquires the print data and executes printing and fax transmission.

However, in the above operation sequence, it is assumed that it is not possible to change the print settings and execute printing after the user has given an instruction to start printing. Accordingly, there is proposed a technology for making it possible for the user to change the print settings after giving the instruction to start printing (see, for example, patent document 1).

(A.) For the purpose of describing the conventional technology, first, the printing architecture of Windows (registered trademark, hereinafter, "®") is described. In the printing architecture of Windows®, commands of print settings and print start instructions from the application are reported to the GDI of OS using API. The GDI is part of the OS.

From the GDI, commands of print settings and print start instructions are reported to the printer driver and PC-FAX driver by DDI. DDI only defines I/F, and therefore the implementation method in the DDI may be freely defined by various manufactures (printer drivers and PC-FAX drivers). By implementing DDI that is called during printing, a dialog can be displayed. The name of the DDI called during printing is "DrvDocumentEvent( )".

By using DDI, it is possible to display a dialog after the user has given a print start instruction and before sending the data to the printer. This technology is used for forcing the user to input a password each time printing is performed and to specify an address for fax transmission. In the following, specific examples are described by taking a confidential printing function installed in the printer driver and an address confirmation function installed in the PC-FAX driver as examples.

FIG. 1 illustrates a screen example of a confidential printing function of the printer driver. After the instruction to start printing, by a confidential printing function, the user is requested to input a user ID and a password. The user cannot press an OK button 501 unless the user inputs a user ID and a password. When the user inputs a user ID and a password and presses the OK button 501, the user ID and the password are transmitted to the printer. In the main unit of the printer, combinations of user IDs and passwords are registered in advance, and unless the input user ID and password match one of the combinations, the printer does not perform printing. In the confidential printing function, to further increase security, the user may be requested to input a password every time printing is performed. When the user presses a cancel button 502, printing is cancelled.

Figure 2:
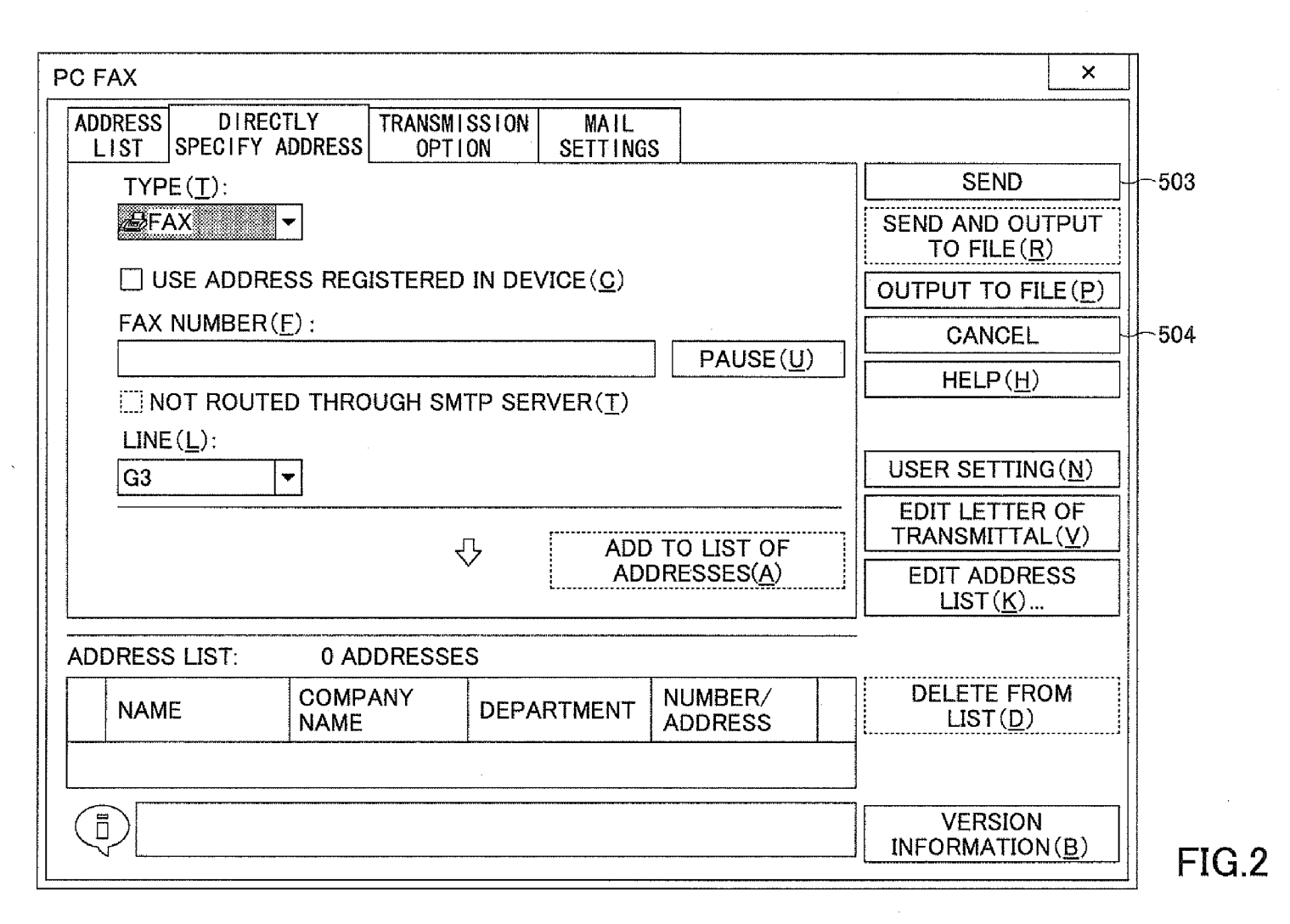

FIG. 2 illustrates a screen example of an address confirmation function of the PC-FAX driver. After the print start instruction is given, the PC-FAX driver displays a dialog illustrated in FIG. 2, and requests the user to input a fax address (fax number). In fax transmission, the address is typically different every time a fax is transmitted, and therefore the PC-FAX driver displays this screen to prevent erroneous transmission.

When the user inputs a fax number and presses a send button 503, the image data is sent to a fax device, and the fax device transmits a fax. When the user presses a cancel button 504, fax transmission is cancelled.

As mechanisms of printing with Windows®, two kinds of spool formats are used when printing with a printer driver, i.e., a RAW spool format and an EMF spool format. The RAW spool format is for performing the printing process by converting document data acquired from the application by the printer driver into RAW data that can be interpreted by the printer, in a process of the application. As viewed from the user, the application cannot be operated until the printing process is completed.

In an EMF spool format, the document data acquired from the application by the OS is converted into an EMF data format that does not depend on the printer, and the data is spooled in a process of the application. Then, the printer driver performs a printing process of converting the EMF data that has been spooled at the spooler process into RAW data that can be interpreted by the printer. As viewed form the user, when the conversion to the EMF data at the process of the application is completed, the application can be operated.

In either mechanism, as a method of implementing DDI, it is possible to display a print setting screen by displaying a dialog after printing is started.

However, the mechanism of applying the print settings changed by the user to the print data cannot be implemented only by the DDI called form the OS. The printer driver includes a UI driver for determining print settings by interactions with a user, and a render driver for converting the document data received from the application into print data in a data format that can be interpreted by the printer, based on the print settings.

The render driver operates by the system authority of the OS, and therefore displaying a dialog decreases the compatibility with respect to the OS. Thus, to change the print settings after a print start instruction is given (during printing), a dialog is displayed using DrvDocumentEvent( ) of DDI included in the UI driver. This DDI is the DDI of the UI driver that is called while the render driver is performing printing. The UI driver is operating by the same authority as the application, and therefore the compatibility with respect to the OS does not decrease.

However, the render driver and the UI driver are different modules, and cannot directly communicate with each other to exchange information. Basically, a driver is only called as a DDI from the OS.

The processing procedures for printing of Windows® are as described above, and therefore when the user wants to change the print settings by displaying a dialog after the print start instruction is given by the user and before the data is output to the printer, it is difficult to apply such changes.

In patent document 1, to solve the above problems, a method is implemented for temporarily outputting, to a file, the information that has been changed after printing has started.

(B.) Next, a description is given of the relationship between a method of installing a printer driver or a PC-FAX driver and making print settings after printing has started. For a printer driver of Windows®, there is an install method referred to as Point & Print.

FIG. 3 schematically illustrates Point & Print. A printer, a server PC, and a client PC are connected to the network. In the server PC and the client PC, an OS (OS for server in the server PC) of the Windows® is installed.

The client PC can use the server PC as a printer server to make a print request to the printer. In this kind of system, the same printer driver as that of the server PC needs to be installed in the client PC. It is highly costly to have an administrator install a printer driver in each of the client PCs in the network.

As a means for solving this problem, in Point & Print, it is possible to download and install a printer driver from the server PC in the client PC. This is a standard function of an OS in the Windows® system. When performing printing procedures by Point & Print, a RAW spool format and an EMF spool format are used.

With the printer driver that has been installed by Point & Print (in the case of EMF spool), the user can change the PC (either the client PC or the server PC) for performing the rendering process (performed by the render driver). A rendering process performed at the client PC side is referred to as "client side rendering". A rendering process performed at the server PC side is referred to as "server side rendering".

However, in the method of using a temporary file, depending on the timing when the printer driver is operating and the level of authority of the user, it may not be ensured that the printer driver always outputs information to the temporary file. Even if the information is output to the temporary file, in an environment where plural applications are operating, the setting may be overwritten.

FIG. 4 schematically illustrates the relationship between the plural applications and a temporary file. The applications 1 and 2 operate on the same PC, and can print document data.
(1) In response to receiving a request from the application 1, the UI driver writes settings in the temporary driver.
(2) In response to receiving a request from the application 2, the UI driver writes settings in the temporary driver.
(3) When the render driver reads settings from the temporary file in response to receiving a request from the application 1, the contents of the temporarily file have changed.

In order to solve the above problem, the print settings are not saved in the temporary file, and instead, the print settings are saved in a print setting saving module.

However, even by the above method, there are two cases where the problems cannot be solved.
Regarding (A.): a case of a printing sequence in EMF spool
Regarding (B.): a case of a printing sequence by a printer driver in which Point & Print is installed
Regarding (A.)

The method of using a print setting saving module uses a DDI call sequence when printing, which can be implemented at the time of RAW spool. However, in a different spool format, the DDI call sequence called from the OS changes. In EMF spool, there is a process of converting document data from the application into EMF data, and a process of converting EMF data into render data that can be interpreted by the printer. Therefore, as an operation inside the OS, two print processing sequences are operated. As a result, the DDI call sequence becomes more complex than RAW spool, and therefore the print settings cannot be passed over at a desired timing.
Regarding (B.)

The method of using a print setting saving module can be implemented in a local environment, where a printer driver is installed in the PC used by the user. However, with the install format of Point & Print, the UI driver and the render driver can operate at different locations by user settings (server side rendering).

In client side rendering, the UI driver and the render driver both operate on the client PC side. However, in server side rendering, the UI driver operates on the client PC side and the render driver operates on the server PC side. In server side rendering, the operating PCs are physically different PCs, and therefore the print setting saving module is only present in the client side PC. In this case, the render driver of the server cannot acquire print settings from the print setting saving module.

FIG. 5 illustrates a list of cases where the print settings cannot be changed after printing has started. As described above, in a case where the install environment is local and the spool format is EMF spool, and in a case where the install environment is Point & Print, the spool format is EMF spool, and the rendering location is the server, it is difficult to change the print settings after printing has started.

Patent Document 1: Japanese Laid-Open Patent Publication No. 2010-066876

SUMMARY OF THE INVENTION

The present invention provides an information processing apparatus and a system, in which one or more of the above-described disadvantages are eliminated.

A preferred embodiment of the present invention provides an information processing apparatus and a system, in which the print settings can be changed after printing has started, regardless of differences in spool formats and the install environment of the printer driver.

According to an aspect of the present invention, there is provided an information processing apparatus including an operation receiving unit configured to receive an operation; a setting receiving unit configured to display a setting condition for printing or transmission and to receive a change to the setting condition, after the operation receiving unit receives an instruction to start printing or to start transmission; an image processing unit configured to acquire, from a document data providing unit, document data that is a printing target or a transmission target, and convert the document data into print data of a printing device based on the setting condition; and a setting condition storage unit in which the setting condition is stored by the setting receiving unit via an operating system by using, as a key, identification information acquired by the setting receiving unit, the identification information identifying a printing process or a transmission process and being generated by the operating system according to the instruction to start printing or to start transmission, wherein the image processing unit acquires the identification information from the operating system, and reads, from the setting condition storage unit, the setting condition via the operating system by using the identification information as a key, and converts the document data into the print data of the printing device based on the setting condition.

According to an aspect of the present invention, there is provided a system in which a first information processing apparatus, a second information processing apparatus, and a printing device are connected via a network, the system including an operation receiving unit configured to receive an operation; a setting receiving unit configured to display a setting condition for printing or transmission and to receive a change to the setting condition, after the operation receiving unit receives an instruction to start printing or to start transmission; an image processing unit configured to acquire, from a document data providing unit, document data that is a printing target or a transmission target, and convert the document data into print data of the printing device based on the setting condition; a setting condition storage unit provided in the second information processing apparatus, in which the setting condition is stored by the setting receiving unit via an operating system of the first information processing apparatus and the second information processing apparatus by using, as a key, identification information acquired by the setting receiving unit, the identification information identifying a printing process or a transmission process and being generated by the operating system of the second information processing apparatus according to the instruction to start printing or to start transmission, wherein the image processing unit acquires the identification information from the operating system of the second information processing apparatus, and reads, from the setting condition storage unit, the setting condition via the operating system of at least the second information processing apparatus by using the identification information as a key, and converts the document data into the print data of the printing device based on the setting condition.

According to an aspect of the present invention, there is provided a non-transitory computer-readable recording medium storing a program that causes an information processing apparatus, including an operation receiving unit for receiving an operation, to execute a method including displaying a setting condition for printing or transmission and receiving a change to the setting condition, after the operation receiving unit receives an instruction to start printing or to start transmission; acquiring, by a setting module, identification information identifying a printing process or a transmission process and being generated by an operating system according to the instruction to start printing or to start transmission; storing the setting condition in a setting condition storage unit via the operating system by using the identification information as a key; acquiring, by an image processing module, the identification information from the operating system; reading, by the image processing module, the setting condition from the setting condition storage unit via the operating system using the identification information as a key; and converting, by the image processing module, document data that is a printing target or a transmission target provided by a document data providing unit into print data of a printing device based on the setting condition read from the setting condition storage unit.

BRIEF DESCRIPTION OF THE DRAWINGS

Other objects, features and advantages of the present invention will become more apparent from the following detailed description when read in conjunction with the accompanying drawings, in which:

FIG. 2 illustrates a screen example of an address confirmation function of the PC-FAX driver;

FIG. 5 illustrates a list of cases where the print settings cannot be changed after printing has started, in the conventional technology;

FIG. 6 schematically illustrates features of a printer driver;

FIGS. 7A and 7B schematically illustrate a printing system;

FIG. 14 is a sequence diagram of a Windows® print architecture shown in FIG. 13 (conventional technology);

FIGS. 15A and 15B illustrate the format of an ExtEscape( ) function;

FIGS. 16A and 16B illustrate the format of a DrvDocumentEvent( ) function and the format of a SendRecvBidiDataFromPort( ) function;

FIGS. 17A and 17B illustrate the format of a PBIDI_REQUEST_CONTAINER structure and the format of a BIDI_REQUEST_DATA structure;

FIG. 20 is a sequence diagram of a Windows® print architecture of RAW spool;

FIGS. 21A and 21B indicate a sequence diagram of a Windows® print architecture of EMF spool;

DETAILED DESCRIPTION OF THE PREFERRED EMBODIMENTS

Figure 1:
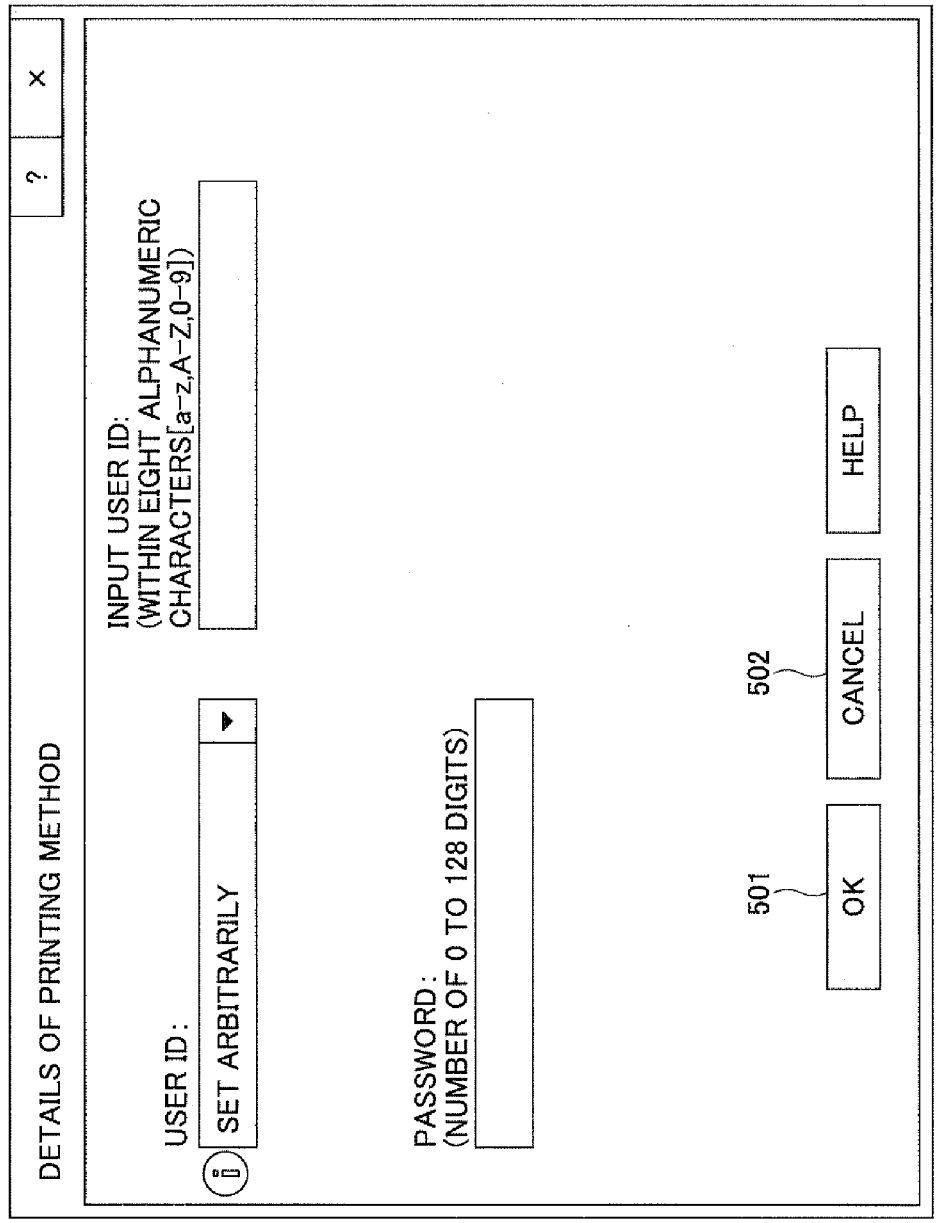
FIG. 1 illustrates a screen example of a confidential printing function of the printer driver.
Figure 3:
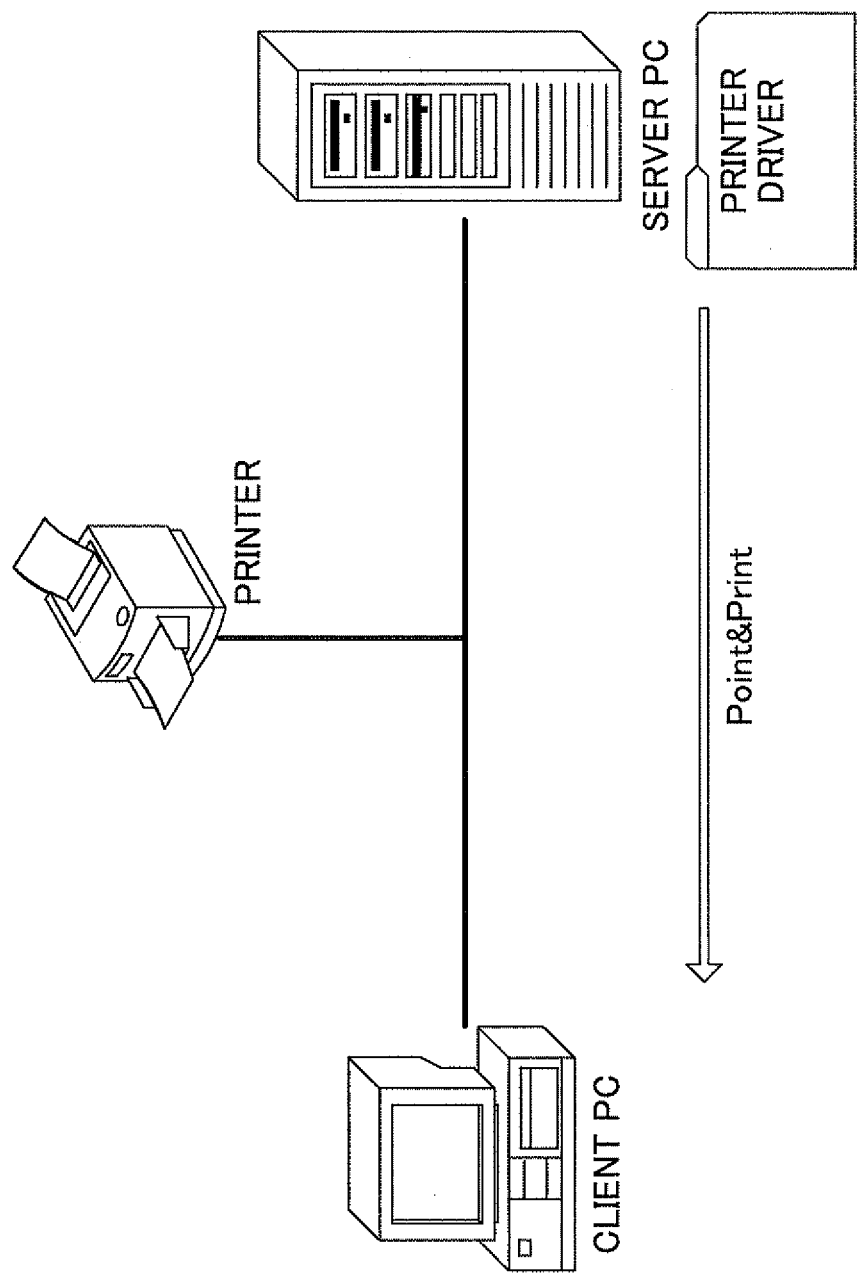
FIG. 3 schematically illustrates Point & Print.
Figure 4:
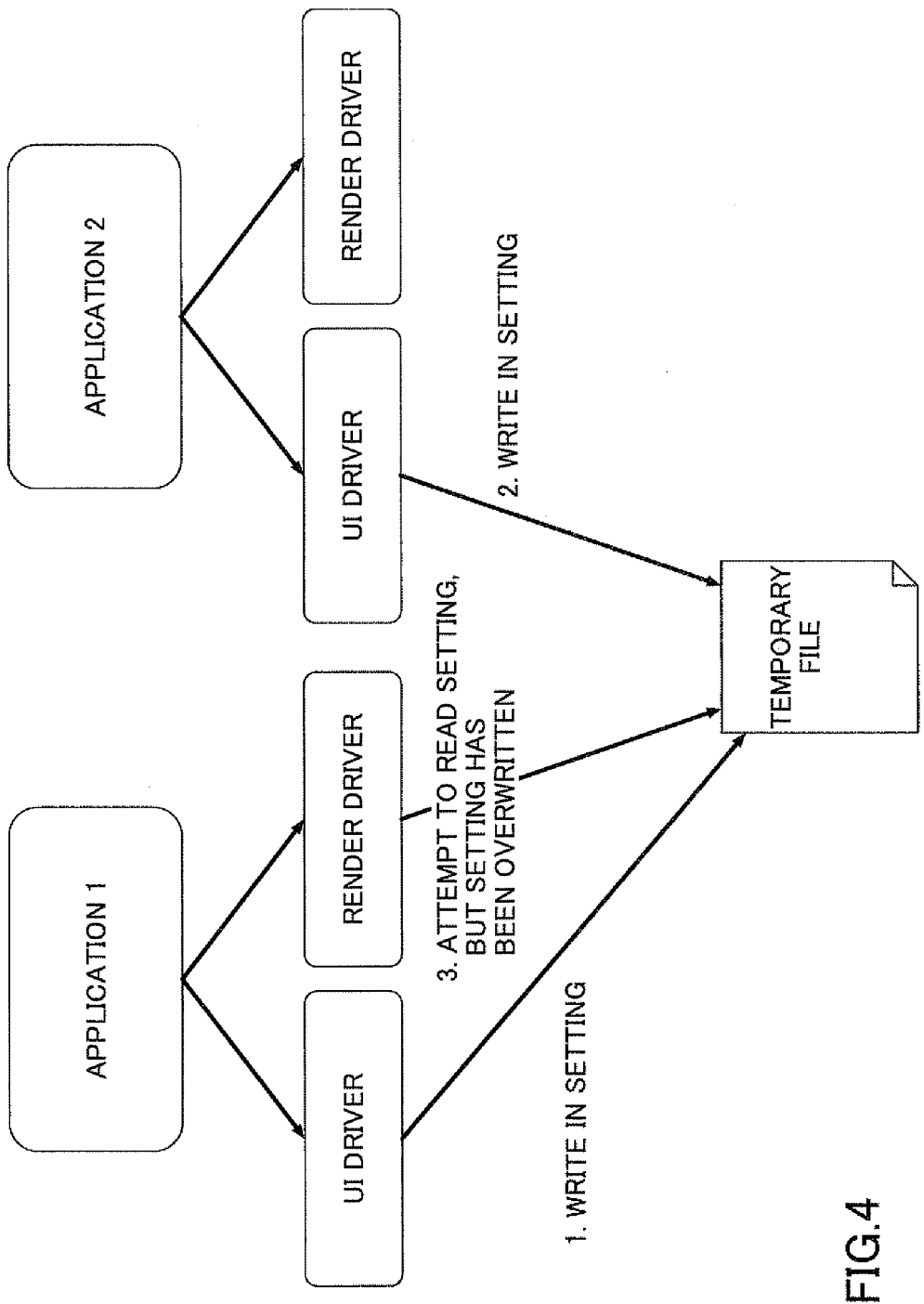
FIG. 4 schematically illustrates the relationship between the plural applications and a temporary file.

A description is given, with reference to the accompanying drawings, of embodiments of the present invention.

FIG. 6 schematically illustrates features of a printer driver according to the present embodiment. A PC (personal computer) 100 is executing an application 31 on an OS 10 of a Windows® system. In a printing architecture of the Windows® system, document data of an application is printed by a printer according to a software hierarchy as illustrated in FIG. 6. In this case, the spool format is not distinguished.

The client system of an OS of the Windows® system includes Windows® NT, Windows® 98, Windows® 2000, Windows® Me, Windows® XP, Windows® Vista, Windows® 7, and any OS of subsequent versions. The server system includes Windows® 2000 Server, 2003 Server, 2008 Server, and any OS of subsequent versions.

1. Start application printing process
2. Application 31 calls GDI API of OS (reserve printer device context)
3. Printer driver 30 generates render data
4. LanguageMonitor 32 performs necessary process
5. Port monitor 33 performs output process according to type of printer port (USB, TCP/IP, etc.)
6. Render data is sent to printer 200

In the present embodiment, in a printing architecture as described above, a job ID generated by an OS (operating system) 10 and the LanguageMonitor 32 are used. The OS 10 applies a job ID to each of the print jobs. The job ID is reported to the printer driver 30.

In an OS of the Windows® system, the printer driver 30 may use the LanguageMonitor 32 provided by the OS 10 or the LanguageMonitor 32 provided by the manufacturer (manufacturer of printer, manufacturer of fax machine, etc.). In the present embodiment, the LanguageMonitor 32 is not merely used as an interface with the port monitor 33, but is also used as a means for storing print settings and job IDs in association with each other.

The UI driver of the printer driver 30 reports, to the LanguageMonitor 32, the job ID together with print settings acquired from the application. The LanguageMonitor 32 stores the print settings and the job ID generated by the OS in association with each other. The LanguageMonitor 32 manages print settings by using job IDs as keys, and therefore the print settings will not be overwritten by other applications.

Furthermore, the render driver reads print settings by specifying a job ID, so that the print settings generated by the UI driver can be acquired from the LanguageMonitor 32. As described above, the render driver can uniquely identify print settings.

Furthermore, the LanguageMonitor 32 is a function of the Windows® system OS, and can thus be used on a server PC of the Point & Print environment. Accordingly, the UI driver can access the LanguageMonitor 32 of the server PC, and also when the render driver of the server PC performs a rendering process, the UI driver can acquire print settings specified with a job ID from the LanguageMonitor 32. As described above, the method of managing print settings according to the present embodiment is also valid in a Point & Print environment, similar to a case where the printer driver is locally installed.

Therefore, with the method of managing print settings according to the present embodiment, the print settings can be changed after printing has started, regardless of the spool format or the install environment.

First Embodiment

Configuration

Figure 7B:
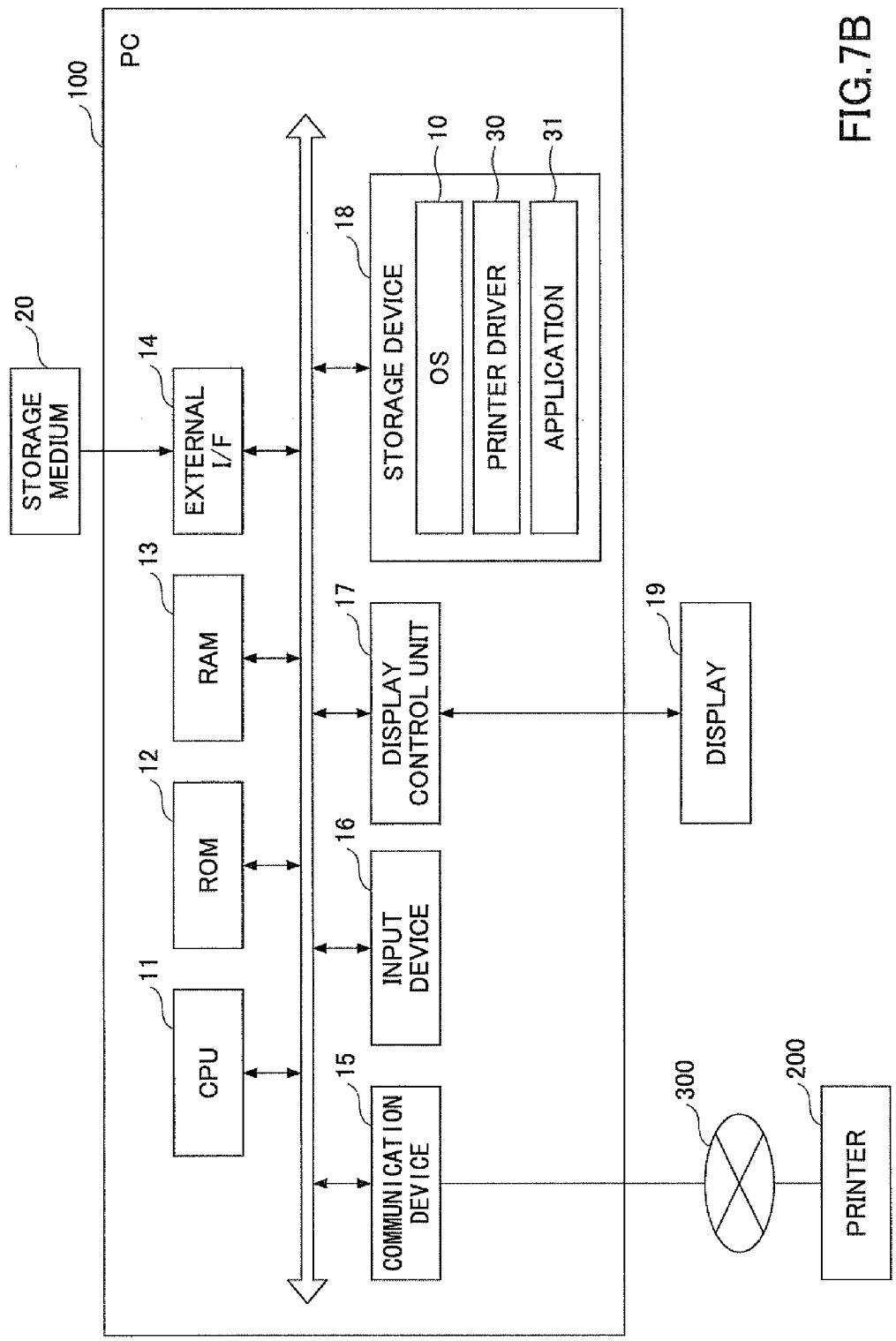

FIG. 7A schematically illustrates a printing system 400, and FIG. 7B illustrates a hardware configuration of the PC (personal computer) 100. The PC 100 and printers 200 are connected via a network 300. Only one printer 200 may suffice.

The PC 100 receives a user's operation, and an application such as document creating software uses GDI, DDI, and a printer driver to request printing. The printer driver 30 creates print data and sends the print data to the printer 200 by procedures described below. The printer 200 may be referred to as any device such as a copier and a fax machine, as long as an image forming function is included. The printer 200 may have either an image forming function of the electrophotographic method or an image forming function of the inkjet method. Furthermore, the PC 100 and the printer 200 may be directly connected by a USB cable.

The PC 100 includes a CPU 11, a ROM 12, a RAM 13, an external I/F 14, a communication device 15, an input device 16, a display control unit 17, and a storage device 18, which are interconnected by a bus. The CPU 11 reads, from the storage device 18, the OS 10, the application 31, and the printer driver 30, and executes these software items by using the RAM 13 as a working memory.

The application 31 is for sending a print request to the printer 200. The application 31 may be various kinds of software such as document creating software, browser software, and presentation material creating software. Any kind of application is applicable, as long as the document data that is to be the printing target can be created, edited, displayed, managed, and printed. The document data may not only include characters, symbols, and numbers, but also various printing targets such as images and photographs.

The RAM 13 is used as a working memory (main storage memory) for temporarily storing necessary data. The ROM 12 stores BIOS, data that is initially set, start programs, etc.

The external I/F 14 is an interface for mounting a cable such as USB cable and a portable storage medium 20. The communication device 15 is a LAN card or an Ethernet (registered trademark) card, which is for sending packet data (mainly print data in the present embodiment) to the printer 200 in response to instructions from the CPU 11.

The input device 16 is a user interface for receiving various operation instructions from the user, which includes a keyboard and a mouse. A touch panel and a voice input device may be used as the input device. The display control unit 17 controls rendering on a display 19 by predetermined resolutions and a number of colors, based on screen information instructed by the application 31. The display 19 is a FPD (Flat Panel Display) such as liquid crystal and organic EL.

The storage device 18 has a nonvolatile memory such as a HDD (Hard Disk Drive) and a flash memory as an entity, and stores the OS 10, the printer driver 30, and the application 31.

The storage medium 20 is a nonvolatile memory such as a SD card and a USB memory. The OS 10, the printer driver 30, and the application 31 are distributed in a state of being recorded in the storage medium 20 or by being downloaded from a server (not shown).

Figure 8:
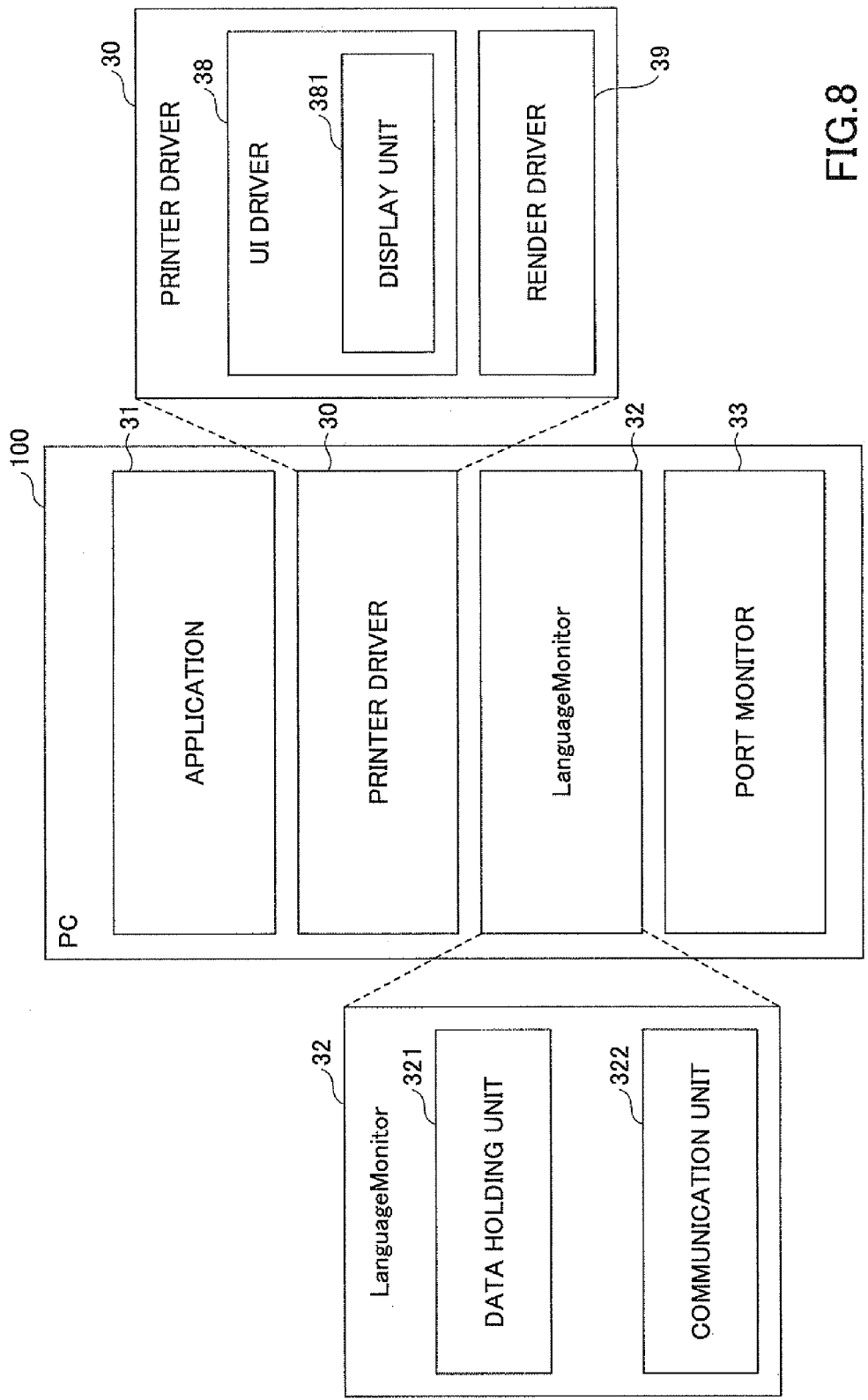
FIG. 8 is a functional block diagram of a PC and a printer driver.

FIG. 8 is a functional block diagram of the PC 100 and the printer driver 30. The PC 100 includes the application 31, the printer driver 30, the LanguageMonitor 32, and the port monitor 33 that operate on the Windows® system OS. Among these, the LanguageMonitor 32 and the port monitor 33 are provided by the OS 10, and are therefore part of the OS 10 in a broad sense. Other elements such as the GDI, the spooler, and the printer processor are not illustrated, but are installed in the PC 100 together with the OS 10.

The printer driver 30 includes a UI driver 38 and a render driver 39. The UI driver 38 includes a display unit 381. The display unit 381 of the UI driver 38 displays a print setting screen (also referred to as a print dialog) on the display 19 when the user inputs operations for printing a document to the application. The user can make settings in the print setting screen such as the number of copies, double-sided printing, "combine", "binding", and "magnify". The display unit 381 of the UI driver 38 can display the print setting screen on the display 19 and receive changes in the print setting, even after the user has input an instruction to start printing. The print settings are stored in a structure (data table) referred to as a DEVMODE structure (hereinafter, "DEVMODE"). DEV- MODE is a data structure defining member variables used for setting common print conditions in various printer drivers 30 operating on the OS.

The render driver 39 refers to DEVMODE, and creates print data to which print settings have been applied, from the document data that is the print target by the application 31. The print data includes render data (for example, PDL data) and control data (for example, a print command of PJL).

The LanguageMonitor 32 is a module having high association with the printer driver 30. The LanguageMonitor 32 can filter the print data to be sent to the port monitor 33. The LanguageMonitor 32 according to the present embodiment includes a data holding unit 321 and a communication unit 322. Among these, the communication unit 322 is for controlling communications when the printer driver 30 sends print data to the port monitor 33, and a conventional LanguageMonitor 32 includes the communication unit 322. The communication unit 322 can receive messages from the printer 200. Meanwhile, the data holding unit 321 stores the print data in association with print settings using job IDs as keys. The data holding unit 321 is implemented by the printer driver 30 using a function of the LanguageMonitor 32. Accordingly, the OS 10 does not require changes, and even if changes are required, only small changes are required. The data holding unit 321 is described below.

Figure 9:
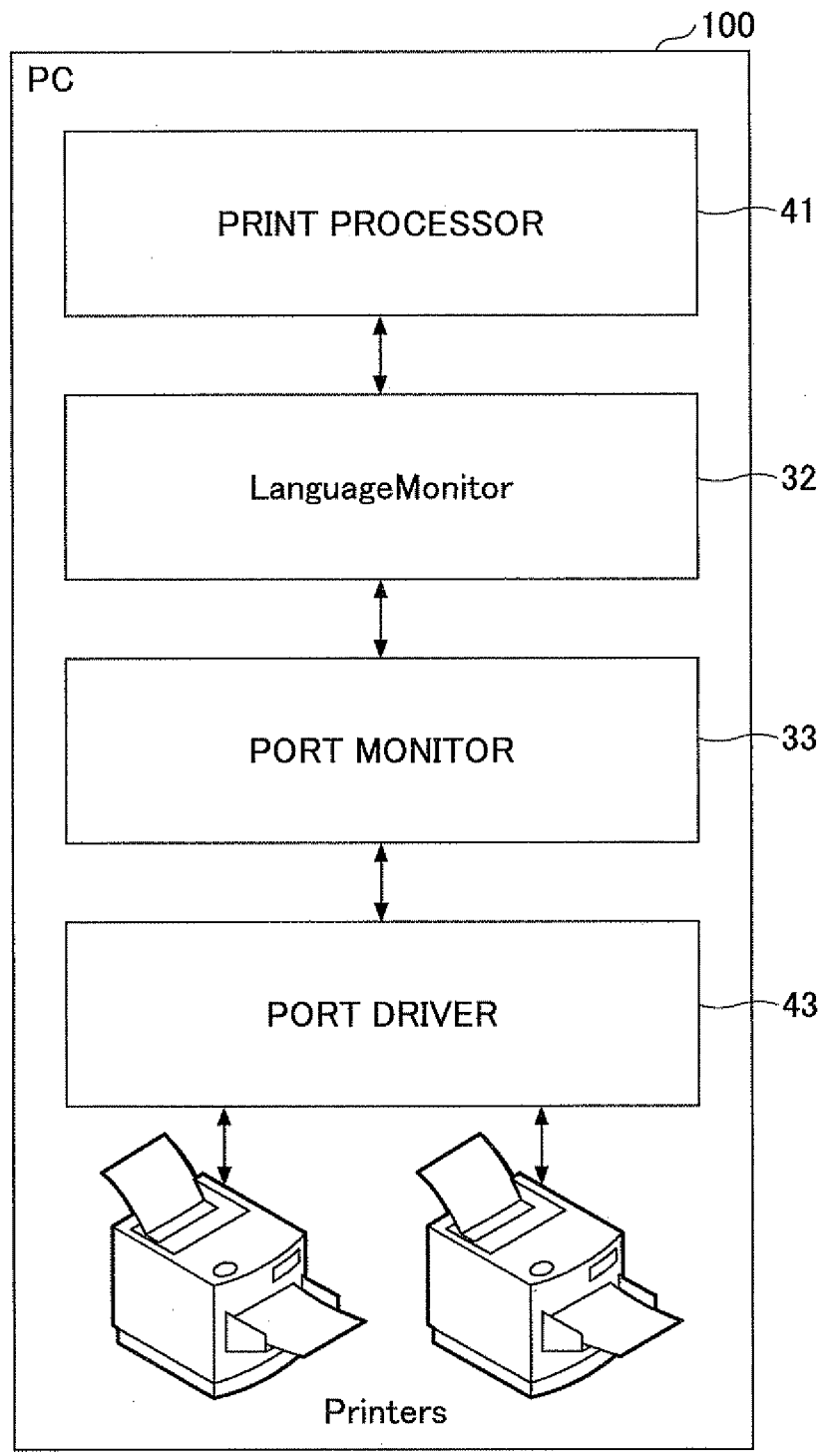
FIG. 9 illustrates operations of a LanguageMonitor.

FIG. 9 illustrates operations of the LanguageMonitor 32. The LanguageMonitor 32 receives print data sent from a print processor 41, and sends the print data to the port monitor 33. The port monitor 33 performs a process based on a communication protocol, and sends the print data to a port driver 43. The port driver 43 controls a connection interface (USB, NIC, etc.) connecting the printer 200 and the PC 100, and sends the print data to the printer 200.

Print Architecture of Conventional Windows® System OS

Figure 10:
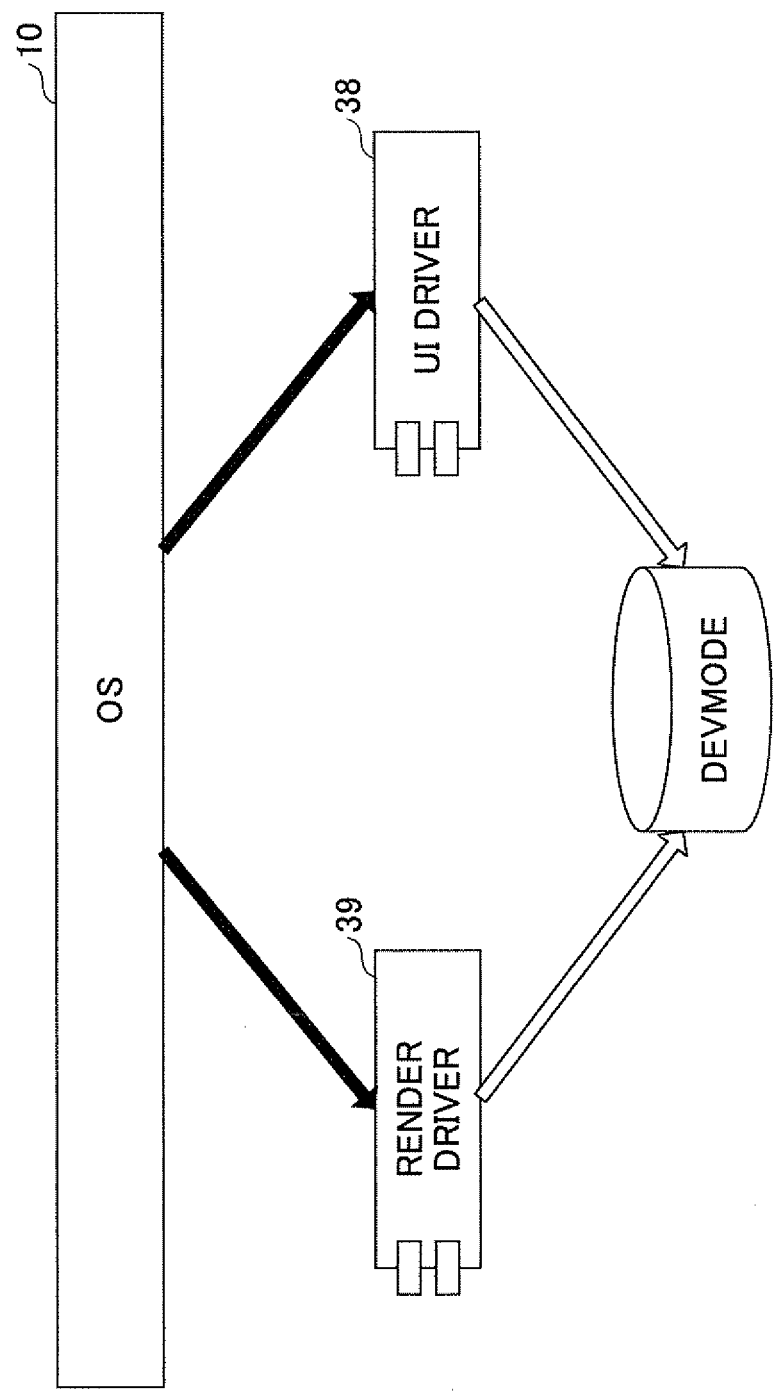
FIG. 10 illustrates a render driver and a UI driver in a Windows® print architecture.

FIG. 10 illustrates the render driver 39 and the UI driver 38 in a print architecture of a Windows® system OS.

A GDI 34 (see FIG. 11) of the OS 10 calls the UI driver 38 and the render driver 39 of the printer driver 30 by DDI call. The UI driver 38 and the render driver 39 cannot directly communicate with each other. However, there is DEVMODE as an argument of DDI that is an I/F for calling a driver from the OS 10, and therefore both the UI driver 38 and the render driver 39 can refer to DEVMODE.

The UI driver 38 called from the OS 10 receives print settings of the user and saves the print settings in DEVMODE DEVMODE is passed from the OS 10 to the render driver 39 when starting to prepare for printing That is to say, the UI driver 38 determines "print settings", and the render driver 39 receives the "print settings" when starting to prepare for printing, and generates print commands and render data based on the print settings. This is the basic printing sequence of a print architecture of the Windows® system OA. The render driver 39 performs processing after the UI driver 38, and therefore with a typical printer driver 30, the print settings cannot be changed after the user gives an instruction to start printing.

Figure 11:
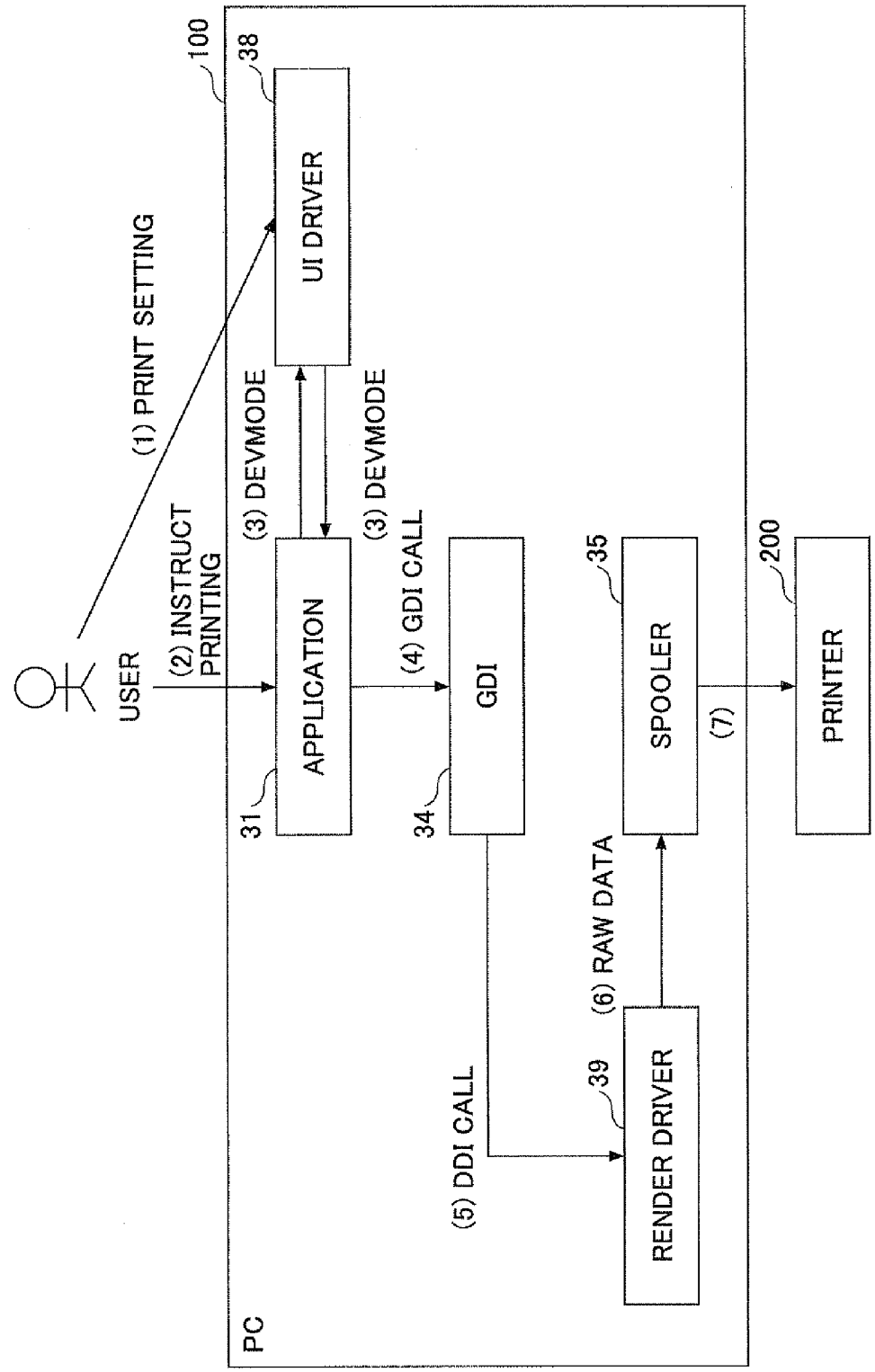
FIG. 11 illustrates the flow of a Windows® print architecture in RAW spool (conventional technology)

FIG. 11 illustrates the flow of a print architecture of a Windows® system OS in RAW spool (conventional technology).

(1) The user changes the print settings by a print dialog (GUI) provided by the UI driver 38 (changes initial values that are already registered).

(2) The user performs an operation to instruct the application to start printing.

(3) The application receives DEVMODE including print settings from the UI driver 38 to receive print settings of the user.

(4) The application sends a print instruction and DEVMODE to the GDI 34 as a GDI call.

(5) The GDI 34 converts the GDI call into a DDI call, and reports the DDI call to the render driver 39.

(6) The render driver 39 sends RAW data that has been converted into a language that can be interpreted by the printer, to a spooler 35.

(7) The spooler 35 sends the RAW data that has been received from the render driver 39 to the printer 200.

Figure 12:
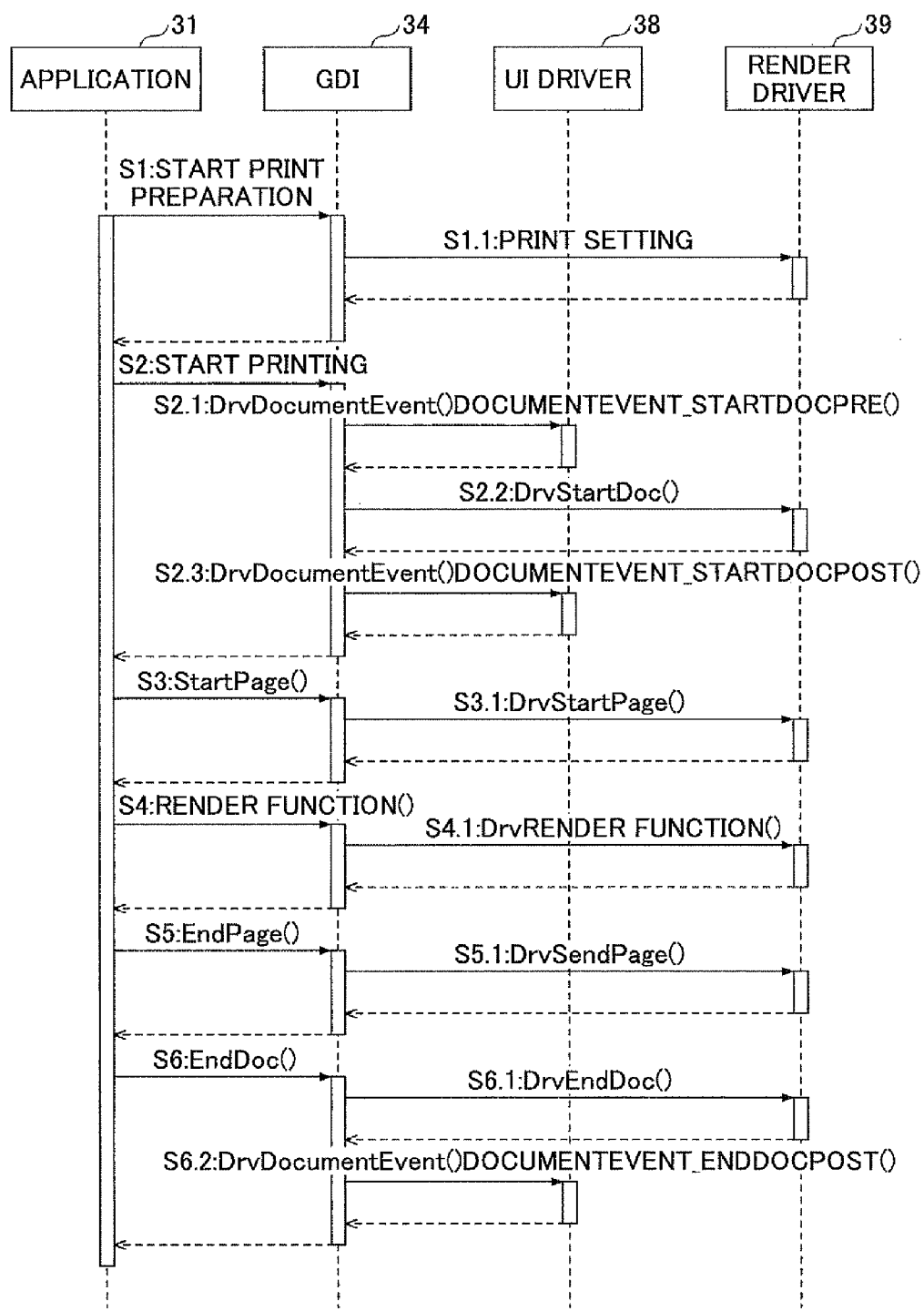
FIG. 12 is a sequence diagram of a Windows® print architecture shown in FIG. 11 (conventional technology)

FIG. 12 is a sequence diagram of a print architecture of the Windows® system OS shown in FIG. 11 (conventional technology). Actually, there are communications (not shown) performed between the GDI 34 and the UI driver 38, or between the GDI 34 and the render driver 39; however, such communications are not illustrated. Messages from the GDI 34 to the UI driver 38 are reported by a DDI function of a UI system, and messages from the GDI 34 to the render driver 39 are reported by a DDI function of a render system.

Before step S1 of FIG. 12, the UI driver 38 has received print settings set by the user, and when the user makes an operation to start printing, the application 31 acquires the print settings stored in DEVMODE.

step S1: The application 31 first instructs the GDI 34 to start print preparation. Specifically, the application 31 calls the GDI 34 by a CreateDC( ) function using a print setting (DEVMODE) as an argument.

step S1.1: The GDI 34 calls the DDI corresponding to API, to send the print settings to the render driver 39. The print settings that have been passed to the GDI 34 from the application 31 with an argument of CreateDC( ) are stored in the argument of DrvEnablePDEV( ) and reported to the render driver 39. Subsequently, the render driver 39 can refer to the print settings until the job is completed (until the device context is erased).

step S2: When the GDI 34 reports the completion of print preparation to the application 31, the application 31 instructs the GDI 34 to start printing. Specifically, the application 31 calls the GDI 34 by a StartDoc( ) function using a DocINFO as an argument.

step S2.1: The GDI 34 instructs the UI driver 38 to start printing. Specifically, the GDI 34 sends DrvDocumentEvent( ) DOCUMENTEVENT_STARTDOCPRE( ) to the UI driver 38.

step S2.2: The GDI 34 instructs the render driver 39 to start printing. Specifically, the GDI 34 sends a DrvStartDoc( ) function to the render driver 39. The OS 10 generates job IDs at predetermined timings by a CreateDC( ) function. The GDI 34 sets a job ID in the argument of the DrvStartDoc( ) function, and therefore the render driver 39 can refer to the job ID.

step S2.3: Similarly, the GDI 34 instructs the UI driver 38 to start printing. Specifically, the GDI 34 sends DrvDocumentEvent( ) DOCUMENTEVENT_STARTDOCPOST( ) to the UI driver 38. The GDI 34 sends a job ID as an argument of this function, and therefore the UI driver 38 can refer to the job ID.

step S3: When the GDI 34 reports that print start has been completed to the application 31, the application 31 repeats a process in units of pages. First, the application 31 instructs the GDI 34 to receive print data of a new page. Specifically, the application 31 sends StartPage( ) to the GDI 34.

step S3.1: The GDI 34 sends DrvStartPage( ) to the render driver 39.

step S4: When a response is received from the render driver 39, the application 31 sends a render function (document data) to the GDI 34.

step S4.1: The GDI 34 sends the render function (document data) to the render driver 39. The render driver 39 converts the document data into print data according to the print settings.

step S5: When the GDI 34 reports that a render process on one page has been completed to the application 31, the application 31 reports that writing of one page has been completed to the GDI 34. Specifically, the application 31 sends EndPage( ) to the GDI 34.

step S5.1: The GDI 34 reports that writing of one page has been completed to the render driver 39. Specifically, the GDI 34 sends DrvSendPage( ) to the render driver 39.

step S6: When the render process is completed for all pages, the application 31 reports that the print job has ended to the GDI 34. Specifically, the application 31 sends EndDoc( ) to the GDI 34.

step S6.1: The GDI 34 reports that the print job has ended to the render driver 39. Specifically, the GDI 34 sends End-Doc( ) to the render driver 39.

step S6.2: The GDI 34 reports that the print job has ended to the UI driver 38. Specifically, the GDI 34 sends DrvDocumentEvent( ) DOCUMENTEVENT_ENDDOCPOST( ) to the UI driver 38.

Subsequently, the device context is erased, and the render driver 39 cannot refer to the print settings (a DDI call of DrvDisablePDEV( ) is reported to the render driver).

Figure 13:
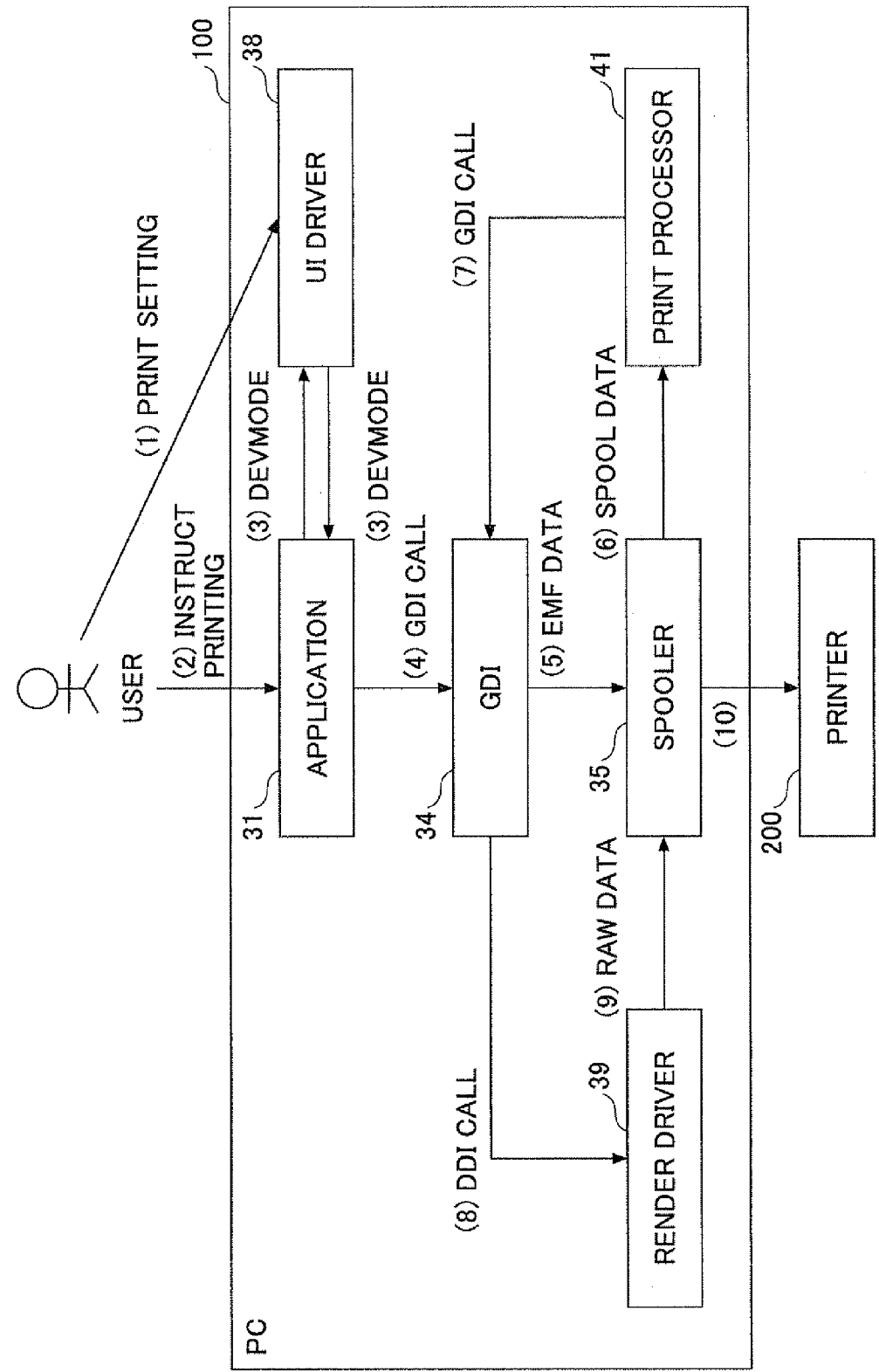
FIG. 13 illustrates a flow of a Windows® print architecture in EMF spool (conventional technology)

FIG. 13 illustrates a flow of a print architecture of Windows® system OS in EMF spool (conventional technology).

(1) The user changes the print settings by a print dialog (GUI) provided by the UI driver 38 (changes initial values that are already registered).

(2) The user performs an operation to instruct the application 31 to start printing.

(3) The application 31 receives DEVMODE including print settings from the UI driver 38 to receive print settings of the user.

(4) The application 31 sends a print instruction to the GDI 34 as a GDI call.

(5) The GDI 34 passes the EMF data to the spooler 35 as spool data.

(6) When all the print data of the application 31 is spooled, the spooler 35 reports that despool is to be performed to the print processor 41, and passes the spool data to the print processor 41.

(7) The print processor 41 edits the spool data by each page to implement functions of combine/reverse order/binding, and reports the edited contents to the GDI 34 as a GDI call.

(8) The GDI 34 converts the GDI call into a DDI call, and reports the DDI call to the render driver 39.

(9) The render driver 39 sends the RAW data that has been converted into a language that can be interpreted by the printer to the spooler 35.

(10) The spooler 35 sends the RAW data received from the render driver 39 to the printer 200.

FIG. 14 illustrates a sequence of a print architecture of Windows® system OS of FIG. 13 (conventional technology). Actually, there are communications (not shown) performed between the GDI 34 and the UI driver 38, or between the GDI 34 and the render driver 39; however, such communications are not illustrated. In EMF spool, the application process and the spooler process are separated.

Before step S1 of FIG. 14, the UI driver 38 has received print settings set by the user, and when the user makes an operation to start printing, the application 31 acquires the print settings stored in DEVMODE.

step S1: The application 31 first instructs the GDI 34 to start print preparation. Specifically, the application 31 calls the GDI 34 by a CreateDC( ) function using a print setting (DEVMODE) as an argument.

step S1.1: The GDI 34 calls the DDI corresponding to API, to send the print settings to the render driver 39. The print settings that have been passed to the GDI 34 from the application 31 with an argument of CreateDC( ) are stored in the argument of DrvEnablePDEV( ) and reported to the render driver 39. Subsequently, the render driver 39 can refer to the print settings until the job is completed (until the device context is erased).

step S2: When the GDI 34 reports the completion of print preparation to the application 31, the application 31 instructs the GDI 34 to start printing. Specifically, the application 31 calls the GDI 34 by a StartDoc( ) function using a DocINFO as an argument.

step S2.1: The GDI 34 instructs the UI driver 38 to start printing. Specifically, the GDI 34 sends DrvDocumentEvent( ) DOCUMENTEVENT_STARTDOC( ) to the UI driver 38.

step S2.2: The GDI 34 sends a job ID to the UI driver 38. Specifically, the GDI 34 sends DrvDocumentEvent( ) DOCUMENT_STARTDOCPOST( ) to the UI driver 38. The GDI 34 sets a job ID as an argument of this function, and therefore the UI driver 38 can refer to the job ID. At this point, the render driver 39 does not acquire the job ID.

step S3: When the GDI 34 reports that print start has been completed to the application 31, the application 31 repeats a process in units of pages. The application 31 instructs the GDI 34 to receive print data of a new page. Specifically, the application 31 sends StartPage( ) to the GDI 34. By StartPage( ) the spooler process starts.

step S4: The application 31 sends a render function (document data) to the GDI 34. The GDI 34 creates EMF data based on print settings.

step S5: The application 31 reports that writing of one page has been completed to the GDI 34. Specifically, the application 31 sends EndPage( ) to the GDI 34.

step S6: When the render process is completed for all pages, the application 31 reports that the print job has ended to the GDI 34. Specifically, the application 31 sends EndDoc( ) to the GDI 34.

As described above, when the process of the application 31 ends, even if printing has not been completed, it appears as if the application 31 has completed printing. Subsequently, a printing process is performed again in the spooler process, where the EMF data is converted into RAW data.

The OS 10 monitors communications between the application 31 and the GDI 34, and at a predetermined timing (for example, after StartPage( ), the OS 10 causes the spooler 35 to start a spooler process.

step S7: The spooler 35 instructs the print processor 41 to start print preparation.

step S7.1: The print processor 41 instructs the GDI 34 to start print preparation.

step S7.1.1: The GDI 34 sends the print settings to the render driver 39. Specifically, the print settings that the application 31 has passed to the GDI 34 by an argument of CreateDC( ) are stored in the argument of DrvEnablePDEV( ) and reported to the render driver 39. Subsequently, the render driver 39 can refer to the print settings until the job ends (until the device context is erased).

step S7.1.2: The GDI 34 instructs the render driver 39 to start printing. Specifically, the GDI 34 sends a DrvStartDoc( )

function to the render driver 39. The OS 10 generates job IDs at predetermined timings by a CreateDC( ) function. The GDI 34 sets a job ID as an argument of the DrvStartDoc( ) function, and therefore the render driver 39 can refer to the job ID.

step S7.2: Subsequently, the print processor 41 repeats a process in units of pages. First, the print processor 41 instructs the GDI 34 to receive print data of a new page. Specifically, the print processor 41 sends GdiStartPageEMF( ) to the GDI 34.

step S7.2.1: The GDI 34 sends DrvStartPage( ) to the render driver 39.

step S7.2.2: The GDI 34 sends the render function (document data) to the render driver 39. The render driver 39 converts the document data into print data according to print settings.

step S7.2.3: The GDI 34 reports that writing of one page has been completed to the render driver 39. Specifically, the GDI 34 sends DrvSendPage( ) to the render driver 39.

Subsequently, the same process is repeated in units of pages.

Print Architecture of Windows® System OS According to Present Embodiment

First, a description is given of API used in the print architecture according to the present embodiment.

FIG. 15A illustrates the format of an ExtEscape( ) function. The ExtEscape( ) function is an API by which a module (each block indicated in the sequence diagram or the functional block diagram) can access a particular module that cannot be accessed via GDI. The ExtEscape( ) function is used when the application sends data to a driver without involving the GDI 34, or when the application acquires data from a module without involving the GDI 34.

hdc is a handle of a device context.

nEscape is an argument used for checking and setting a function of the ExtEscape( ) function.

cbInput is the size of a structure that is sent by the ExtEscape( ) function.

lpszInData is a pointer of the structure sent by the ExtEscape( ) function.

cbOutput is the size of a structure for receiving the structure sent by the ExtEscape( ) function.

lpszOutData is the pointer of a structure for receiving the structure sent by the ExtEscape( ) function.

The ExtEscape( ) function is an API that can be called, with respect to the device context acquired by CreateDC( ). Thus, the UI driver 38 can call the ExtEscape( ) function while there is a device context undergoing a sequence process.

FIG. 15B is a sequence diagram in a case where an application calls ExtEscape( ).

(i) The application calls ExtEscape( ) from the GDI 34.

(ii) The GDI 34 converts ExtEscape( ) into a DDI call of DrvEscape( ), and reports the DDI call to the render driver 39.

Meanwhile, the render driver 39 or the UI driver 38 may call the ExtEscape( ). ExtEscape( ) can be called by the respective modules if it is between CreateDC( ) and DeleteDC( ), and therefore the sequence of FIG. 15B may be inserted in an arbitrary position of the conventional sequences illustrated in FIGS. 12 and 14.

FIG. 16A illustrates the format of a DrvDocumentEvent( ) function. The DrvDocumentEvent( ) function is a DLL for processing a particular event relevant to printing document data.

hPrinter is a handle of a printer.

hdc is a handle of a device context.

iEsc is an escape code for identifying an event of a processing target, provided by the module that is the call source.

cbIn is the size of data sent by pvIn.

pvIn is the pointer of data that is sent.

cbOut stores a value specified by a function as a cbOutput parameter of ExtEscape( ) when iEsc is DOCUMENTEVENT_ESCAPE. cbOut stores the size of a structure pvOut received by the receiving side when iEsc is DOCUMENTEVENT_QUERYFILTER.

pvOut is the pointer of the structure pvOut received by the receiving side.

In the present embodiment, the DrvDocumentEvent( ) function is called according to need, between DDI calls by which the GDI 34 calls the render driver 39, during printing after CreateDC( ). DrvDocumentEvent( ) is a DDI for performing a single process, and therefore data cannot be shared between two successive DrvDocumentEvent( ) functions. In this respect, the DrvDocumentEvent( ) function is different from DDI for calling the render driver 39. The DrvDocumentEvent( ) function is a DDI of the UI system, and therefore a dialog may be displayed.

Furthermore, there is the device context (hdc) as the argument, and therefore after the DDI call of DrvDocumentEvent( ), the module can call API requiring the device context. For example, when the UI driver 38 calls an API of a render system by using the device context as an argument, it is possible to report a render instruction to the corresponding render driver 39.

FIG. 16B illustrates a format of SendRecvBidiDataFromPort( ). The SendRecvBidiDataFromPort( ) function is a function applied to the LanguageMonitor 32. Similar to the printer driver 30, the LanguageMonitor 32 also has an I/F determined by the OS 10. The SendRecvBidiDataFromPort( ) format is one of the I/F, and supports bidirectional communications between the application and the printer and between the application and the printer server.

hPort is a handle of a port provided by the module that is the call source.

dvAccessBit is provided by the module that is the call source, and is an ACCESS_MASK for allowing access to a printer or a printer server.

pAction is a request action provided by the module that is the call source.

pReqData is a pointer of a PBIDI_REQUEST_CONTAINER structure including request data.

ppResData is a pointer to a memory area for receiving the address of the BIDI_RESPONSE_CONTAINER structure including response data.

FIG. 17A illustrates the format of a PBIDI_REQUEST_CONTAINER structure. The PBIDI_RESPONSE_CONTAINER structure has substantially the same contents as the PBIDI_REQUEST_CONTAINER. The PBIDI_REQUEST_CONTAINER structure is a container for storing a list of bidi requests, and the PBIDI_RESPONSE_CONTAINER structure is a container for storing a list of bidi responses.

The OS 10 of the Windows® system provides schemas of databases for providing combinations of requests and responses that can be used for bidirectional communications between the printer and the application, as "Bidi Request and Response Schemas". By registering a job ID and print settings in the requests and responses, the modules can acquire print settings by using a job ID as a key, using the mechanism of the OS 10.

version is the version of the schema, which is presently 1.

Flags is a setting of a flag reserved by the system (OS 10), which needs to be zero.

Count is the number of "bidi requests" of an "aData" member.

aData[ ] is an arrangement of the BIDI_REQUEST_DATA structure, and each element has one bidi request.

FIG. 17B illustrates the format of a BIDI_REQUEST_DATA structure. The BIDI_REQUEST_DATA structure stores one bidi request.

dwReqNumber is an index of a request, and is used for matching requests and responses of operations by multi-requests.

pSchema is a pointer to a memory location including the first byte of the schema character string.

data is a BIDI_DATA according to the schema.

Storing Job ID and Print Settings in LanguageMonitor

Conventionally, the OS 10 generates unique IDs (job IDs) in a system, in the order of receiving print start instructions. In both the RAW spool and the EMF spool, there is a step of acquiring a job ID performed by the render driver 39 and the UI driver 38. That is to say, the render driver 39 can receive the job ID with the argument of DrvStartDoc( ). The UI driver 38 can receive the job ID with the argument of DrvDocumentEvent( ) DOCUMENTEVENT_STARTDOCPOST( ).

Figure 18:
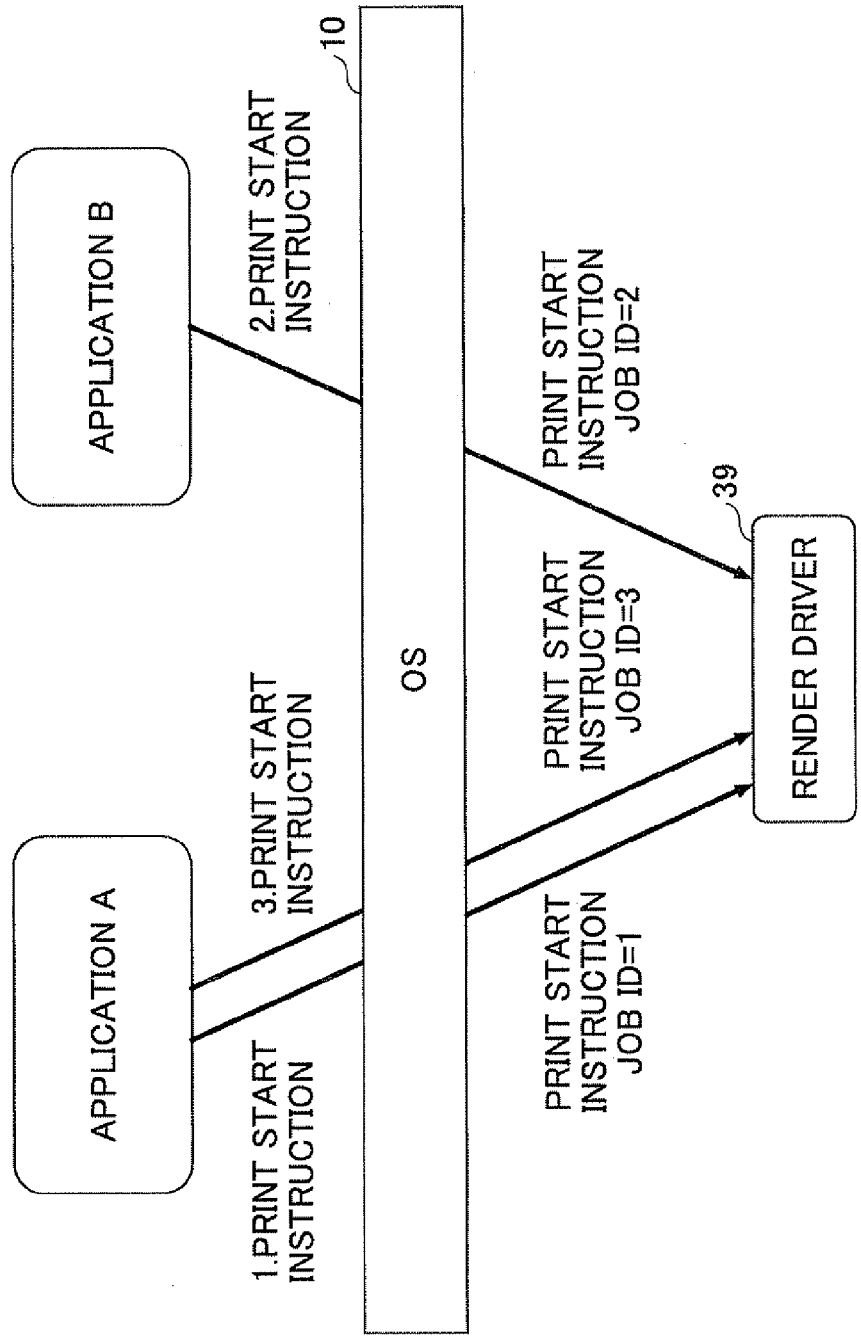
FIG. 18 schematically illustrates a job ID assigned by an OS.

FIG. 18 schematically illustrates a job ID assigned by the OS 10. The application A and the application B arbitrarily issue print start instructions 1 through 3. The OS 10 assigns job ID1 to the print start instruction 1 of application A, assigns job ID2 to the print start instruction 2 of application B, and assigns job ID3 to the print start instruction 3 of the application A.

The render driver 39 and the UI driver 38 acquire these job IDs, and therefore the uniqueness of the job IDs acquired by the render driver 39 and the UI driver 38 is ensured.

In the present embodiment, the job ID is used as a key to store the print settings in the LanguageMonitor 32.

Figure 19:
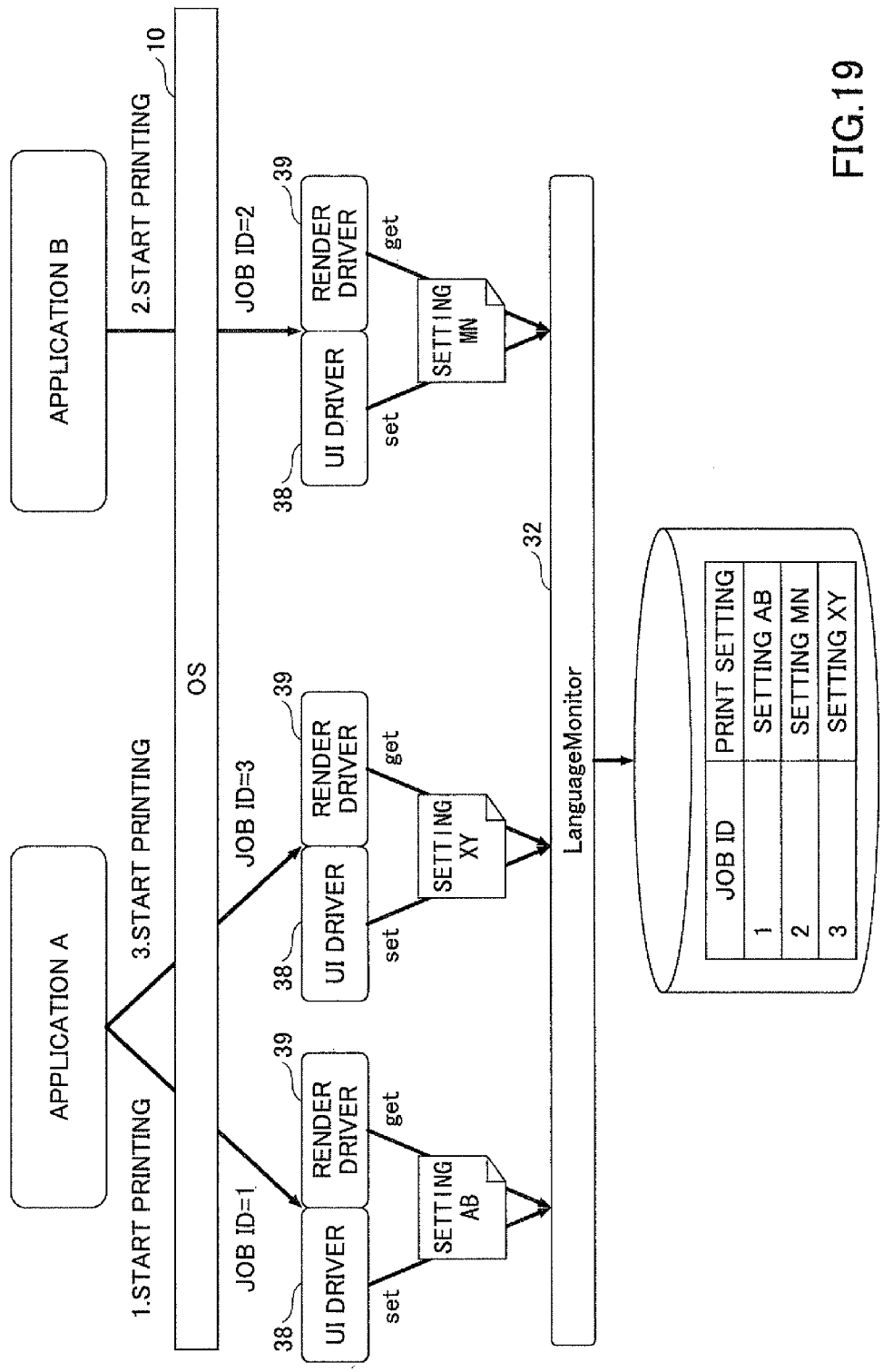
FIG. 19 schematically illustrates the job ID and print settings stored in the LanguageMonitor.

FIG. 19 schematically illustrates the job ID and print settings stored in the LanguageMonitor 32. In applications A and B, print start is instructed as follows. The OS 10 assigns job IDs in the order that print start instructions are given.

1. Application A gives print start instruction
2. Application B gives print start instruction
3. Application A gives print start instruction The UI driver 38 displays a print setting screen after printing starts, and receives print settings. The print settings are set in the LanguageMonitor 32. In the example of FIG. 19, the LanguageMonitor 32 holds combinations of job IDs and print settings in a table.

When print settings are required for generating print data, the render driver 39 requests (get) the LanguageMonitor 32 to provide print settings, by using a job ID as a key.

As described above, the OS 10 assigns a unique key to each print job, and the LanguageMonitor 32 has a mechanism of holding information by using the key. Accordingly, even if plural applications arbitrarily start plural print jobs, the printer driver 30 can mange the print settings for each print job.

In order to set print settings in the LanguageMonitor 32 and to request print settings from the LanguageMonitor 32, a SendRecvBidiDataFromPort( ) function is used. When the printer driver 30 calls the LanguageMonitor 32 by SendRecvBidiDataFromPort( ), the LanguageMonitor 32 can be used as a saving location. That is to say, the data holding unit 321 is implemented by the LanguageMonitor 32 and the SendRecvBidiDataFromPort( ) function.

As described, even if the LanguageMonitor 32 is not developed by the manufacturer, a standard LanguageMonitor 32 can be used together with the OS 10. When the manufacturer has not developed the LanguageMonitor 32, the standard LanguageMonitor 32 operates. If the manufacturer has developed a LanguageMonitor 32 in line with a predetermined defined I/F, unique functions can be added. In the present embodiment, by using an I/F refereed to as SendRecvBidiDataFromPort( ), the printer driver 30 can exchange data with the LanguageMonitor 32.

The UI driver 38 sets a constant that means setting in "pAction", sets a job ID in "pReqData", and sets, in "ppResData", a pointer to the address in which the print settings are stored. The LanguageMonitor 32 stores a job ID in aData[ ] which is one of the elements in the arrangement of a BIDI_REQUEST_DATA structure, and stores (a point to) a print setting in aData[ ] which is one of the elements in the arrangement of the BIDI_RESPONSE_DATA structure. Accordingly, the job IDs and the print settings are associated to each other as shown in FIG. 19.

Furthermore, the render driver 39 sets a constant that means read in "pAction", sets a job ID in "pReqData", and specifies a return value (not shown). Accordingly, the LanguageMonitor 32 stores, in the return value, the pointer of the address in which the print settings corresponding to "ppReqData" are stored, and returns the return value to the render driver 39.

By using the function of the OS 10 as described above, the keys in the data holding unit 321 of the LanguageMonitor 32 can be used as job IDs of print jobs that do not overlap each other.

Operation Procedure

FIG. 20 is a sequence diagram of a print architecture of the Windows® system OS of a RAW spool.

Actually, there are communications (not shown) performed between the GDI 34 and the UI driver 38, or between the GDI 34 and the render driver 39; however, such communications are not illustrated. Messages from the GDI 34 to the UI driver 38 are reported by a DDI function of a UI system, and messages from the GDI 34 to the render driver 39 are reported by a DDI function of a render system.

Before step S1 of FIG. 20, the UI driver 38 has received print settings set by the user, and when the user makes an operation to start printing, the application 31 acquires the print settings stored in DEVMODE.

step S1: The application 31 first instructs the GDI 34 to start print preparation. Specifically, the application 31 calls the GDI 34 by a CreateDC( ) function using a print setting (DEVMODE) as an argument.

step S1.1: The GDI 34 calls the DDI corresponding to API, to send the print settings to the render driver 39. The print settings that have been passed to the GDI 34 from the application 31 with an argument of CreateDC( ) are stored in the argument of DrvEnablePDEV( ) and reported to the render driver 39. Subsequently, the render driver 39 can refer to the print settings until the job is completed (until the device context is erased).

step S2: When the GDI 34 reports the completion of print preparation to the application 31, the application 31 instructs the GDI 34 to start printing. Specifically, the application 31 calls the GDI 34 by a StartDoc( ) function using a DocINFO as an argument.

step S2.1: The GDI 34 instructs the UI driver 38 to start printing. Specifically, the GDI 34 sends DrvDocumentEvent( ) DOCUMENTEVENT_STARTDOCPRE( ) to the UI driver 38.

step S2.2: The GDI 34 instructs the render driver 39 to start printing. Specifically, the GDI 34 sends a DrvStartDoc( ) function to the render driver 39. The OS 10 generates job IDs at predetermined timings by a CreateDC( ) function. The GDI 34 sets a job ID in the argument of the DrvStartDoc( ) function, and therefore the render driver 39 can refer to the job ID.

step S2.3.1: The UI driver 38 detects, in the print settings, that there is a setting for receiving changes in the print settings after the print start instruction is given. Accordingly, the UI driver 38 starts a process of displaying a pop-up. The UI driver 38 cannot directly communicate with the render driver 39, and therefore sends ExtEscape( ) to the GDI 34.

step S2.3.1.1: The GDI 34 reports DrvEscape( ) to the render driver 39. The render driver 39 sends a print setting being held to the UI driver 38 via the GDI 34.

step S2.4: According to the process of ExtEscape( ) it is assumed that the UI driver 38 has acquired the print settings. When the print settings include a setting of an instruction to display a print dialog for changing the print settings after the print start instruction (during printing), the UI driver 38 displays a print dialog as shown in FIGS. 1 and 2, and receives changes in the print setting given by the user.

step S2.3.2: As the user closes the print dialog, the UI driver 38 uses the job ID as a key by SendRecvBidiDataFromPort( )::set, and sends the print settings changed by the user to the LanguageMonitor ("::" means that "DOCUMENTEVENT" is omitted). Accordingly, the LanguageMonitor 32 can hold the job ID and the print settings in association with each other. At this time, the contents indicating whether the user closed the dialog by selecting "OK" or "cancel" are also sent.

step S3: When the GDI 34 reports that print start has been completed to the application 31, the application 31 repeats a process in units of pages. First, the application 31 instructs the GDI 34 to receive print data of a new page. Specifically, the application 31 sends StartPage( ) to the GDI 34.

step S3.1: The GDI 34 sends DrvStartPage( ) to the render driver 39.

step S3.1.1: Only when the first DDI call of DrvStartPage( ) is received, the render driver 39 uses the held job ID as a key to request a print setting to the LanguageMonitor 32 by SendRecvBidiDataFromPort( )::get. The LanguageMonitor 32 holds information indicating whether the user closed the dialog by selecting "OK" or "cancel" at step S2.3.2. When the user closed the print dialog by "OK", the render driver 39 generates print data based on the print settings. When the user closed the dialog by "cancel", the render driver 39 does not send the data to a printer or a fax machine.

step S4: When a response is received from the render driver 39, the application 31 sends a render function (document data) to the GDI 34.

step S4.1: The GDI 34 sends the render function (document data) to the render driver 39. The render driver 39 converts the document data into print data according to the print settings.

The subsequent procedures are the same as those of the conventional technology, and are thus not further described.

As described above, the render driver 39 can acquire, from the LanguageMonitor 32, print settings that are uniquely specified by a job ID. That is to say, even when the print settings are changed after printing has started in RAW spool, the print settings are not overwritten.

Figure 21A:
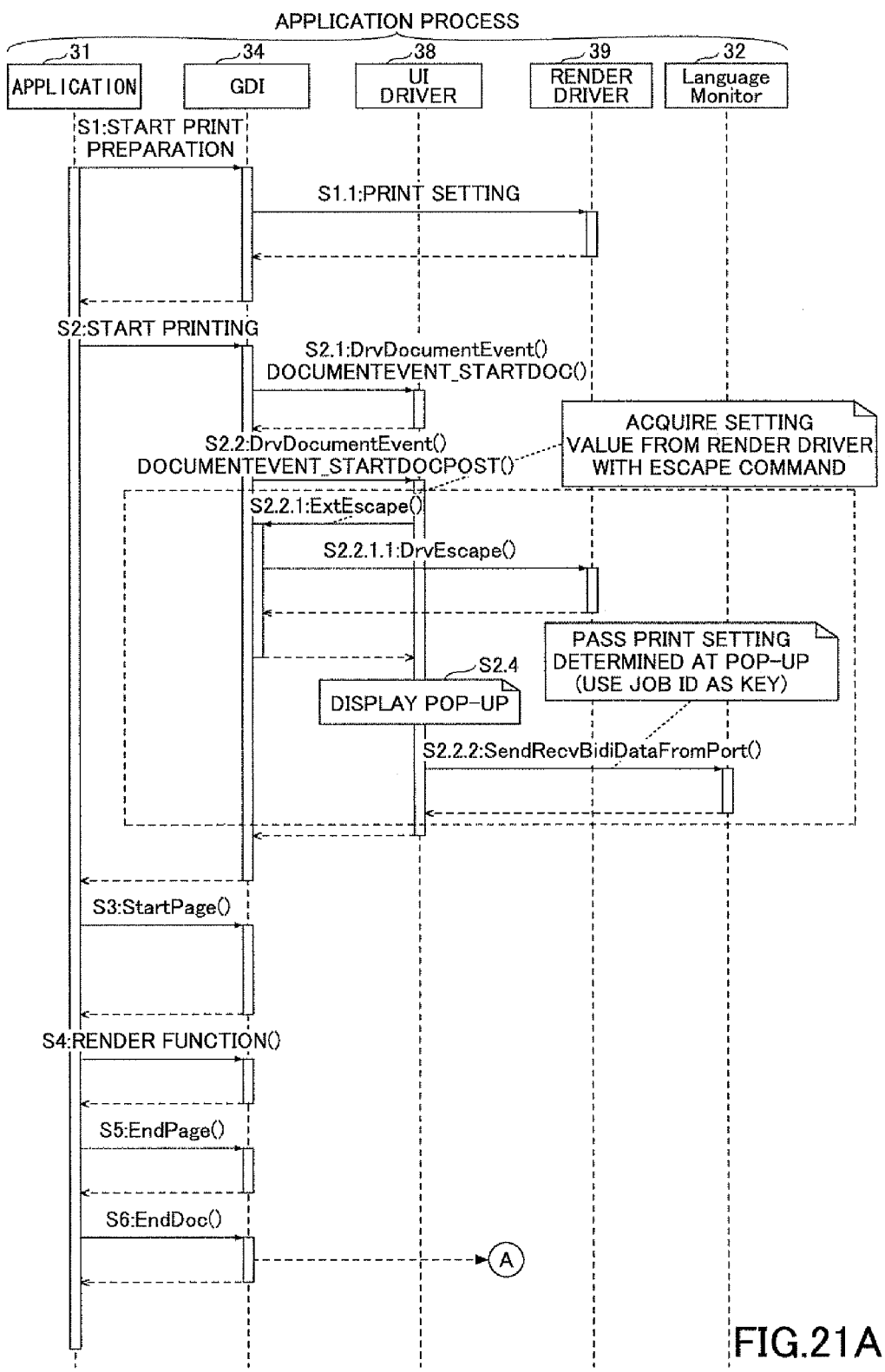

FIGS. 21A and 21B indicate a sequence diagram of a print architecture of the Windows® system OS of an EMF spool. Actually, there are communications (not shown) performed between the GDI 34 and the UI driver 38, or between the GDI 34 and the render driver 39; however, such communications are not illustrated.

Before step S1 of FIG. 21A, the UI driver 38 has received print settings set by the user, and when the user makes an operation to start printing, the application 31 acquires the print settings stored in DEVMODE.

step S1: The application 31 first instructs the GDI 34 to start print preparation. Specifically, the application 31 calls the GDI 34 by a CreateDC( ) function using a print setting (DEVMODE) as an argument.

step S1.1: The GDI 34 calls the DDI corresponding to API, to send the print settings to the render driver 39. The print settings that have been passed to the GDI 34 from the application 31 with an argument of CreateDC( ) are stored in the argument of DrvEnablePDEV( ) and reported to the render driver 39. Subsequently, the render driver 39 can refer to the print settings until the job is completed (until the device context is erased).

step S2: When the GDI 34 reports the completion of print preparation to the application 31, the application 31 instructs the GDI 34 to start printing. Specifically, the application 31 calls the GDI 34 by a StartDoc( ) function using a DocINFO as an argument.

step S2.1: The GDI 34 instructs the UI driver 38 to start printing. Specifically, the GDI 34 sends DrvDocumentEvent( ) DOCUMENTEVENT_STARTDOC( ) to the UI driver 38.

step S2.2: The GDI 34 sends a job ID to the UI driver 38. Specifically, the GDI 34 sends DrvDocumentEvent( ) DOCUMENTEVENT_STARTDOCPOST( ) to the UI driver 38. The GDI 34 sets a job ID in the argument of this function, and therefore the UI driver 38 can refer to the job ID. At this point, the render driver 39 has not acquired the job ID.

step S2.2.1: The UI driver 38 detects, in the print settings, that there is a setting for receiving changes in the print settings after the print start instruction is given. Accordingly, the UI driver 38 starts a process of displaying a pop-up. The UI driver 38 uses the device context as an argument to call ExtEscape( ) from the GDI 34.

step S2.2.1.1: The GDI 34 sends the DDI call of DrvEcape( ) to the render driver 39 to request the print settings held by the render driver 39. The render driver 39 sends the held print settings to the UI driver 38 via the GDI 34.

step S2.4: According to the process of ExtEscape( ), it is assumed that the UI driver 38 has acquired the print settings. When the print settings include a setting of an instruction to display a print dialog for changing the print settings after the print start instruction (during printing), the UI driver 38 receives changes in the print settings given by the user.

step S2.2.2: As the user closes the print dialog, the UI driver 38 uses the job ID as a key by SendRecvBidiDataFromPort( )::set, and sends the print settings changed by the user to the LanguageMonitor 32. Accordingly, the LanguageMonitor 32 can hold the job ID and the print settings in association with each other. At this time, the contents indicating whether the user closed the dialog by selecting "OK" or "cancel" are also sent. Steps S3 through S6 are the same as the conventional technology, and are thus not further described. Up to this point, the printing (generation of EMF data) in the application process ends.

Subsequently, a printing process is performed again in the process of the spooler 35, where the EMF data is converted into RAW data.

The OS 10 monitors communications between the application 31 and the GDI 34, and at a predetermined timing (for example, after StartPage( )), the OS 10 causes the spooler 35 to start a spooler process.

step S7: The spooler 35 instructs the print processor 41 to start print preparation.

step S7.1: The print processor 41 instructs the GDI 34 to start print preparation.

step S7.1.1: The GDI 34 sends the print settings to the render driver 39. Specifically, the print settings that the application 31 has passed to the GDI 34 by an argument of CreateDC( ) are stored in the argument of DrvEnablePDEV( ) and reported to the render driver 39. Subsequently, the render driver 39 can refer to the print settings until the job ends (until the device context is erased).

step S7.1.2: The GDI 34 instructs the render driver 39 to start printing. Specifically, the GDI 34 sends a DrvStartDoc( ) function to the render driver 39. The OS 10 generates job IDs at predetermined timings by a CreateDC( ) function. The GDI 34 sets a job ID as an argument of the DrvStartDoc( ) function, and therefore the render driver 39 can refer to the job ID.

step S7.2: Subsequently, the print processor 41 repeats a process in units of pages. First, the print processor 41 instructs the GDI 34 to receive print data of a new page. Specifically, the print processor 41 sends GdiStartPageEMF( ) to the GDI 34.

step S7.2.1: The GDI 34 sends DrvStartPage( ) to the render driver 39.

step S7.2.1.1: Only when the first DDI call of DrvStartPage( ) is received, the render driver 39 uses the held job ID as a key to request a print setting to the LanguageMonitor 32 by SendRecvBidiDataFromPort( )::get. The LanguageMonitor 32 holds information indicating whether the user closed the print dialog by selecting "OK" or "cancel" at step S2.2.2. When the user closed the dialog by "OK", the render driver 39 generates print data based on the print settings. When the user closed the dialog by "cancel", the render driver 39 does not send the data to a printer or a fax machine.

step S7.2.2: The GDI 34 sends the render function (document data) to the render driver 39. The render driver 39 converts the document data into print data according to the print settings.

step S7.2.3: The GDI 34 reports that writing for one page has been completed to the render driver 39. Specifically, the GDI 34 sends DrvSendPage( ) o the render driver 39.

Subsequently, the same process is repeated in units of pages.

That is to say, even when the print settings are changed after printing has started in EMF spool, the print settings are not overwritten.

In FIGS. 20 and 21, the printing sequence differs according to the spool format, and therefore there appears to be a difference.

However, the same processes are performed in the RAW spool and the EMF spool in the following functions of the render driver 39, DrvEnablePDEV( )
    DrvStartDoc( )
    DrvStartPage( )
    DrvEscape( )

the following function of the UI driver 38,

DrvDocumentEvent( ) DOCUMENTEVENT_STARTDOCPOST( ) and the following functions of the LanguageMonitor32.

SendRecvBidiDataFromPort( )::set
    SendRecvBidiDataFromPort( )::get

Therefore, the method of managing print settings according to the present embodiment can be implemented regardless of the spool format, and even in an environment where plural applications are operating, the user can change the print settings after printing starts.

Second Embodiment

In the present embodiment, a description is given of a method of managing print settings using the LanguageMonitor 32 in a Point & Print environment.

Figure 22:
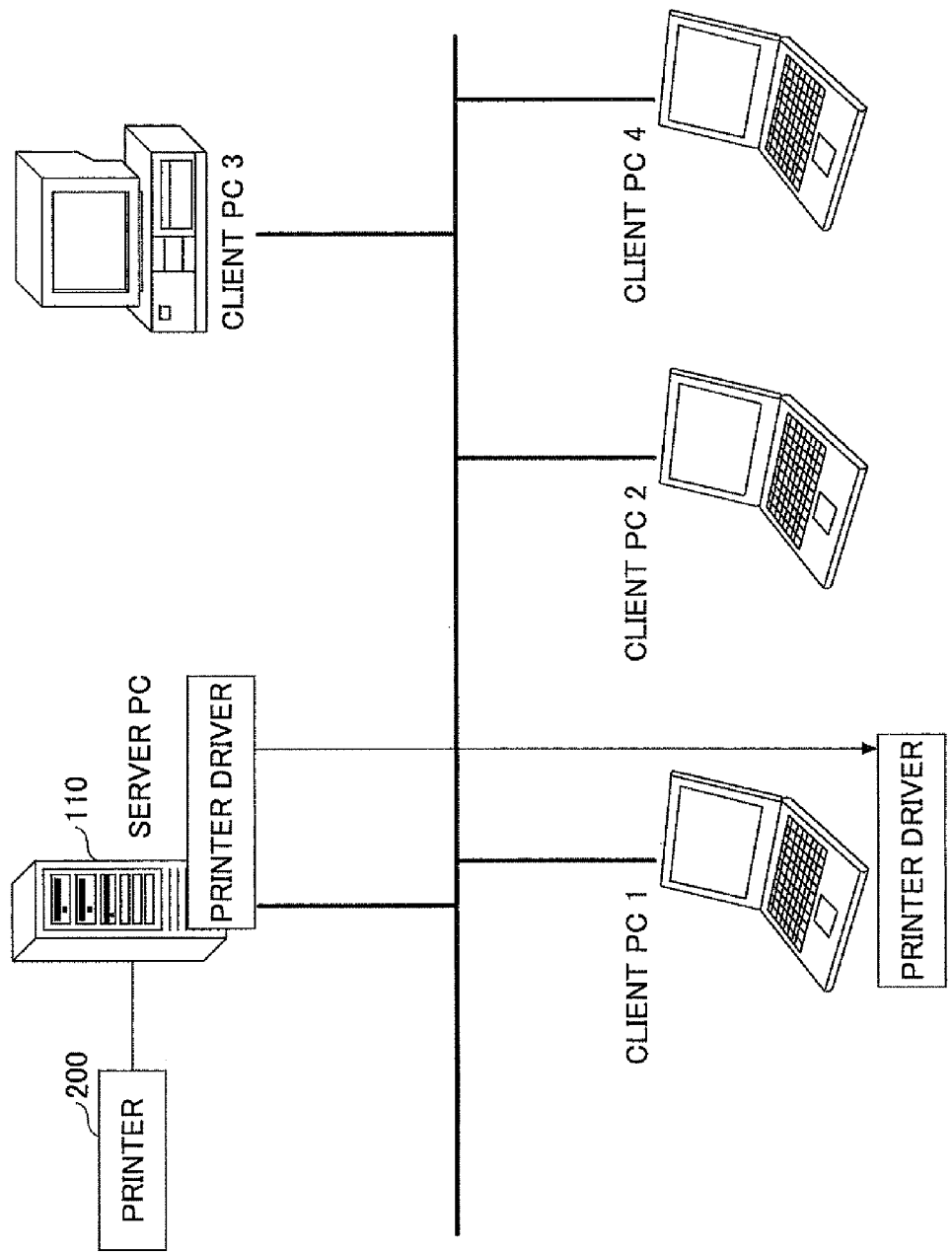
FIG. 22 schematically illustrates an example of a printing system including a Point & Print environment.

FIG. 22 schematically illustrates an example of a printing system including a Point & Print environment. Four client PCs are connected to a server PC via a network. The printer 200 is connected to a server PC 110, but the printer 200 may be connected to the network.

The printer driver 30 is registered in the server PC 110, and the server PC 110 distributes the printer driver 30 to the client PCs by copying the printer driver 30, and therefore the user can easily install the printer driver 30. In the following, it is assumed that the client PC 1 is connected to the server PC 110 and a printer driver is installed by Point & Print.

In server side rendering in a Point & Print environment, the client PC receives a print setting of the user, and the server PC 110 performs the render process, and therefore it is difficult to share print settings.

Meanwhile, in the present embodiment, the client PC and the server PC 110 exchange print settings by using the LanguageMonitor 32 inside print architecture provided by the OS 10. Therefore, the server PC 110 can acquire print settings from the client PC by a process in the print architecture. Thus, even if the user changes the print settings after printing starts, the server PC 110 can perform a rendering process based on the changed print settings.

Figure 23:
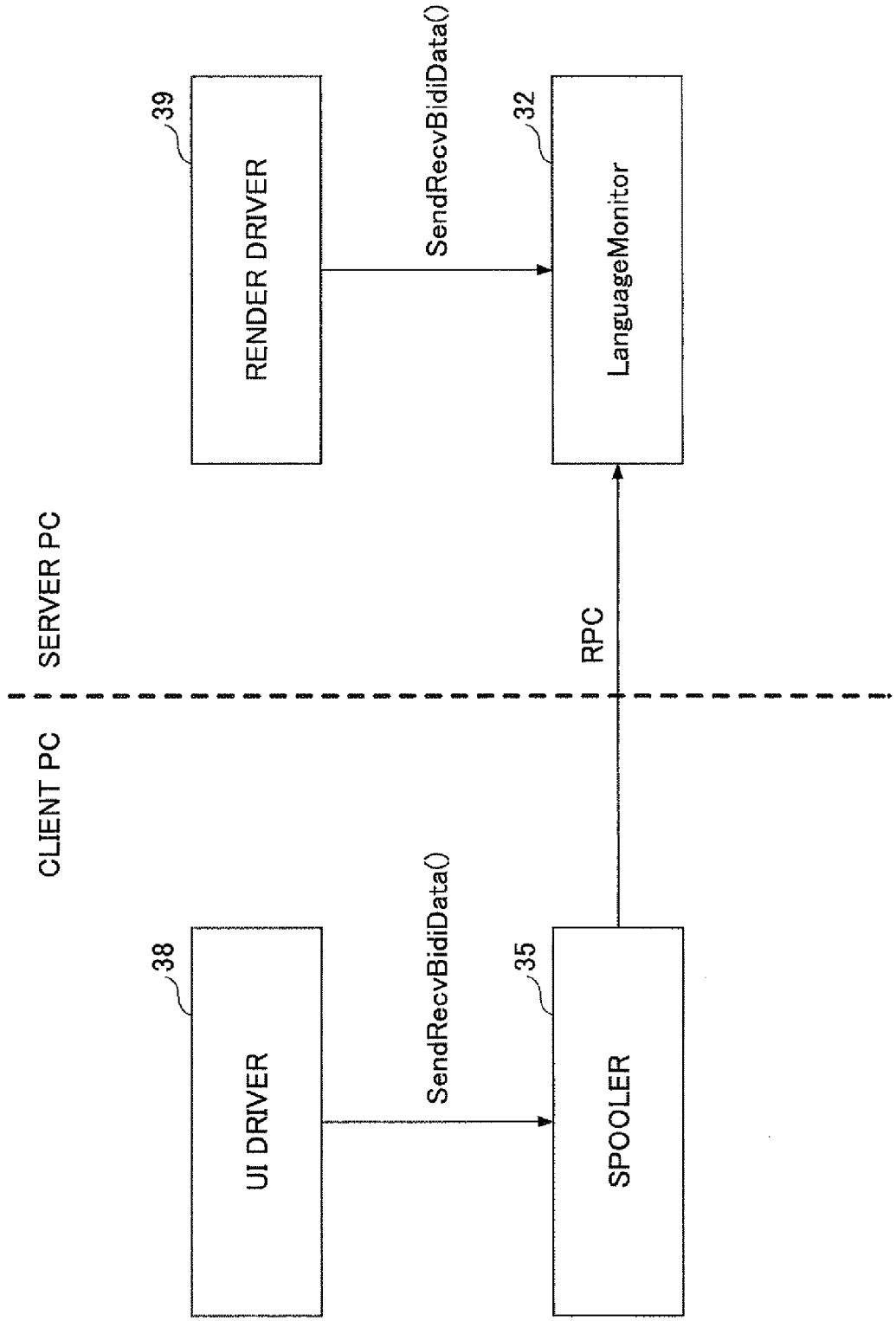
FIG. 23 illustrates the positioning of the LanguageMonitor in a Point & Print environment.

FIG. 23 illustrates the positioning of the LanguageMonitor 32 in a Point & Print environment. The LanguageMonitor 32 is a module incorporated in the print architecture of the Windows® system OS. Therefore, even if the client PC is in charge of the process of the UI driver 38 and the server PC is in charge of the process of the render driver 39 by Point & Print, only one LanguageMonitor 32 functions at the server PC. Therefore, the printer driver 30 of the client PC and the printer driver 30 of the server PC 110 access one LanguageMonitor 32. That is to say, when the UI driver 38 of the client PC accesses the LanguageMonitor 32, the OS 10 of the client PC and the OS 10 of the server PC establish communications between the client PC and the server PC 110 (for example, by using RPC (Remote Procedure Call)). Then, the UI driver 38 appears to be accessing the LanguageMonitor 32 of the client PC.

As described above, the same Windows® system OS 10 is installed in the client PC and the server PC 110, and therefore the client PC and the server PC 110 can share the LanguageMonitor 32 of the print architecture of the Windows® system OS. With a module uniquely developed by the manufacturer, differences in access rights and communication errors tend to arise; however, in the present embodiment, such inconveniences seldom arise. Furthermore, for the same reason, the LanguageMonitor 32 has high compatibility with the OS 10.

In Point & Print, there are spool formats of the RAW spool and the EMF spool. However, in the case of the RAW spool, there is no server side rendering. The RAW spool is a process of an application, and therefore the location of rendering is limited.

In other cases, which are client side rendering of RAW spool, client side rendering of EMF spool, and server side rendering of EMF spool, the LanguageMonitor 32 is used as in FIG. 23.

Figure 24:
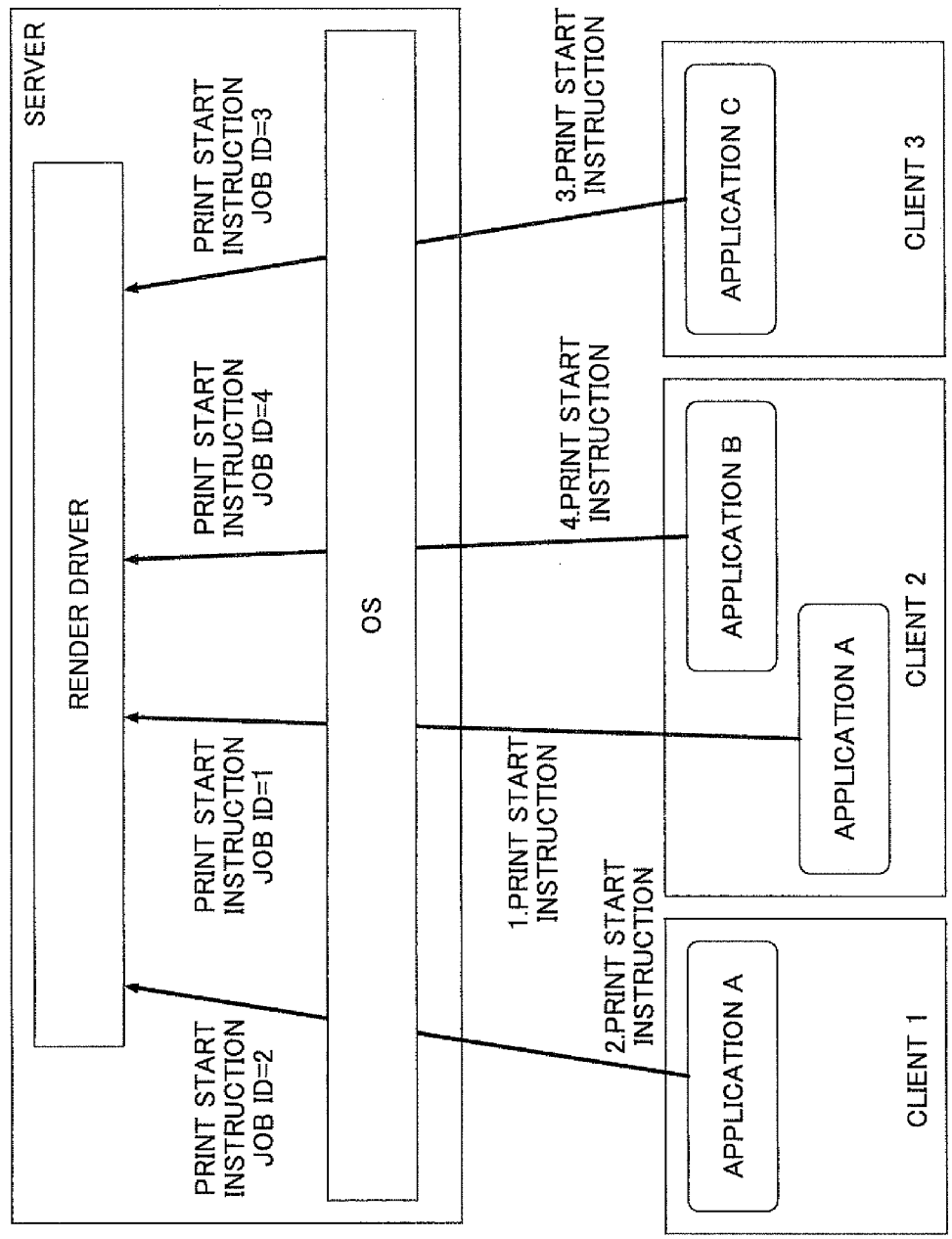
FIG. 24 is for describing job IDs in a Point & Print environment.

FIG. 24 is for describing job IDs in a Point & Print environment. When the client PC is connected to the server PC 110 by RPC, and a handle to a printer of the server PC 110 is acquired from the client PC, a session is established. When a session is established, the server PC 110 generates a job ID and reports the job ID to the client PC. Therefore, in each of the cases of client side rendering of RAW spool, client side rendering of EMF spool, and server side rendering of EMF spool, the server PC 110 generates a job ID. The timing of generating a job ID is the same as that of the first embodiment.

In FIG. 24, the client PC 1 executes the application A, the client PC 2 executes the applications A and B, and the client PC 3 executes the application C. The applications instruct print start at arbitrary timings.

Print start instruction 1: client PC 2+application A

Print start instruction 2: client PC 1+application A

Print start instruction 3: client PC 3+application C

Print start instruction 4: client PC 2+application B

The OS 10 of the server PC 110 assigns unique job IDs 1 through 4 to the print start instructions 1 through 4. That is to say, the server PC 110 assigns job IDs that do not overlap each other even when one client PC starts printing from a single application, or when one client PC starts printing from plural applications, or when one client PC starts printing plural times from a single application.

Similar to the first embodiment, the UI driver 38 can receive a job ID that the client PC has acquired from the server PC 110, by an argument of DrvStartDoc( ) that is a DDI call of the GDI 34. The render driver 39 can receive the job ID by an argument of DrvStartDoc( ) sent from the GDI 34.

Figure 25:
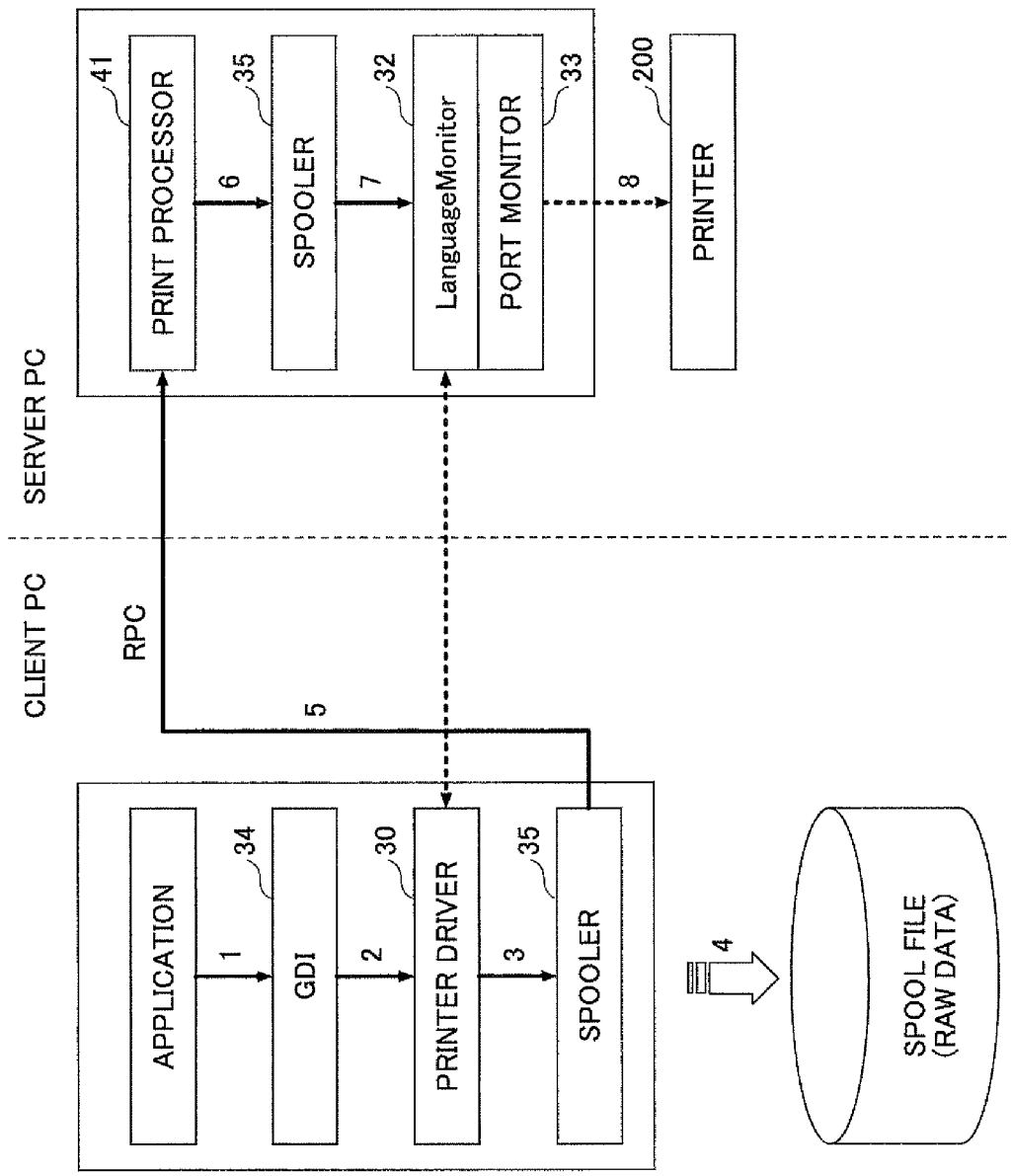
FIG. 25 schematically illustrates the printing procedures of RAW spool in a Point & Print environment.

FIG. 25 schematically illustrates the printing procedures of RAW spool in a Point & Print environment. In the Point & Print environment, when the user sets RAW spool (server side rendering cannot be set), a render process (generates RAW data) is performed at the client PC.

(1) The application calls the GDI 34. At this time, the server PC 110 assigns a unique job ID for the server, and returns the job ID to the client PC.

(2) The GDI 34 calls the printer driver 30.

(3) The render driver 39 of the printer driver 30 acquires the job ID by an argument of DrvStartDoc( ) from the GDI 34. Furthermore, the UI driver 38 of the printer driver 30 acquires the job ID by DrvDocumentEvent( ) DOCUMENTEVENT_STARTDOCPOST( ) from the GDI 34. When the UI driver 38 displays a print dialog, the user can change the print setting. The UI driver 38 sets the print settings acquired from the render driver 39 by DrvEscape( ), in the LanguageMonitor 32 by SendRecvBidiDataFromPort( )::set. Then, when printing starts in units of pages, the render driver 39 acquires print settings from the LanguageMonitor 32 by SendRecvBidiDataFromPort( )::get.

(4) According to need, the render driver 39 performs a render process, and sends print data to the spooler 35. The spooler 35 spools the print data (RAW data).

(5) The spooler 35 sends the print data to the server PC 110 by RPC.

(6) The process shifts to the server PC 110, and the print processor 41 of the server PC 110 spools the print data.

(7) The spooler 35 sends the print data to the LanguageMonitor 32.

(8) The LanguageMonitor 32 and the port monitor 33 sends print data to the printer. At this stage, the LanguageMonitor 32 does not perform a process.

As described above, the print procedures are the same as a case where the printer driver 30 is locally operating, except that the job ID is generated at the server PC 110. Therefore, the sequence diagram would be the same as FIG. 20. Thus, the operation of managing job IDs and print settings using the LanguageMonitor 32 can be implemented in a case of RAW spool in a Point & Print environment.

Figure 26:
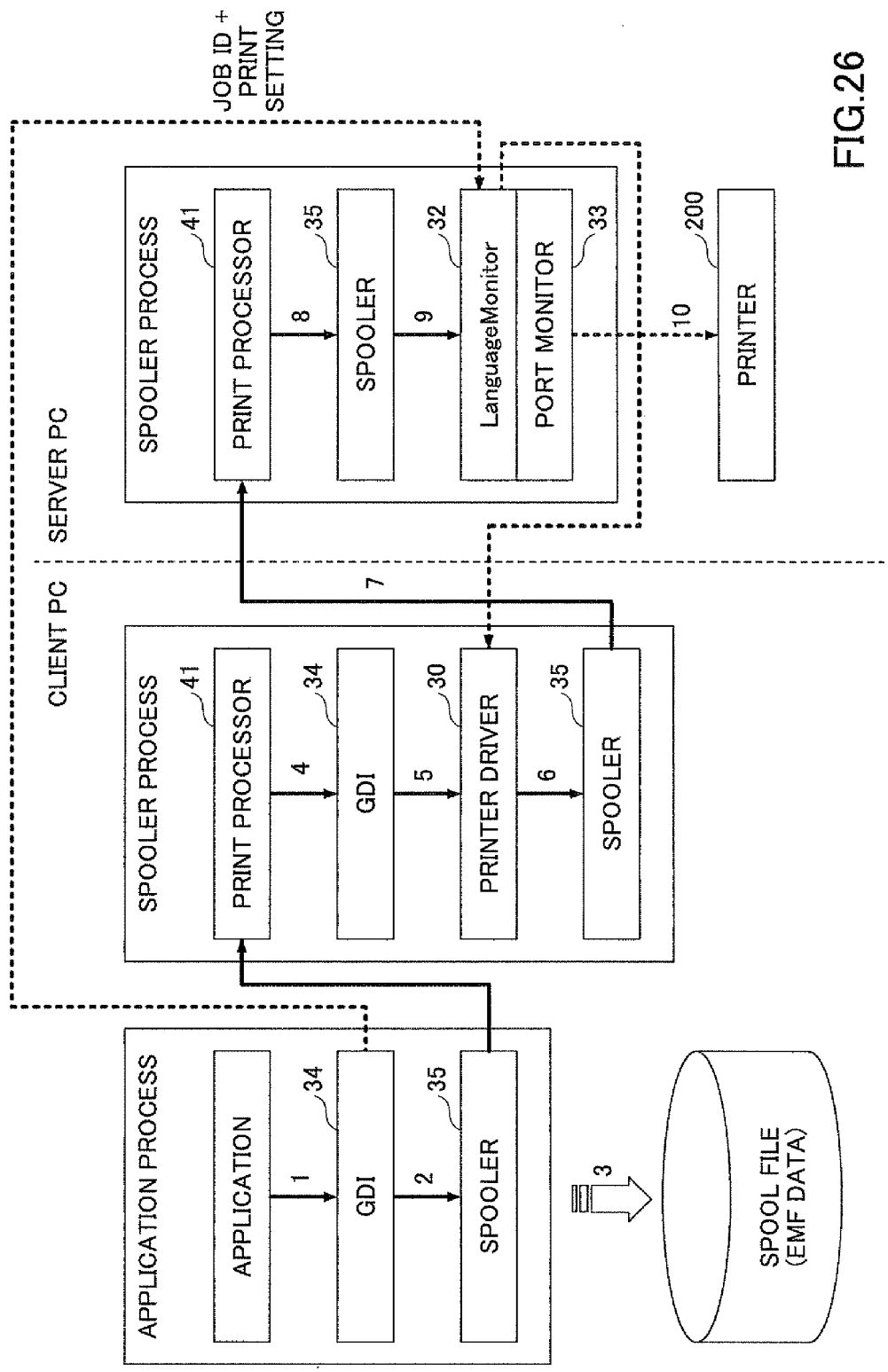
FIG. 26 schematically illustrates the printing procedures of EMF spool (client side rendering) in a Point & Print environment.

FIG. 26 schematically illustrates the printing procedures of EMF spool (client side rendering) in a Point & Print environment. In a Point & Print environment, when the user sets EMF spool, the user can select the rendering side. When the user selects client side rendering, the rendering process (generation of RAW data) is performed at the client PC.

(1) The application calls the GDI 34. At this time, the server PC 110 assigns a unique job ID for the server, and returns the job ID to the client PC.

(2) The GDI 34 calls the printer driver 30. The UI driver 38 of the printer driver 30 acquires a job ID from the GDI 34 by DrvDocumentEvent( ) DOCUMENTEVENT_STARTDOCPOST( ). When the UI driver 38 displays a print dialog, the user can change the print setting. The UI driver 38 sets the print setting acquired form the render driver 39 by DrvEscape( ), in the LanguageMonitor 32 by SendRecvBidiDataFromPort( )::set. The GDI 34 generates EMF data form the document data.

(3) The spooler 35 spools the print data (EMF data).

(4) The print processor 41 calls the GDI 34.

(5) The GDI 34 calls the printer driver 30.

(6) The render driver 39 of the printer driver 30 acquires a job ID from the GDI 34 by an argument of DrvStartDoc( ). When printing starts in units of pages, the render driver 39 acquires print settings from the LanguageMonitor 32 by SendRecvBidiDataFromPort( )::get. The render driver 39 of the printer driver 30 creates RAW data from EMF data.

(7) The spooler 35 sends print data (RAW data) to the server PC 110 by RPC.

(8) The process shifts to the server PC 110, and the print processor 41 of the server PC 110 spools the print data.

(9) The spooler 35 sends the print data to the LanguageMonitor 32.

(10) The LanguageMonitor 32 and the port monitor 33 send the print data to the printer. At this stage, the LanguageMonitor 32 does not perform a process.

As described above, in EMF spool also, the print procedures are the same as a case where the printer driver 30 is locally operating, except that the job ID is generated at the server PC 110. Even if the process is performed separately at the client PC and the server PC 110, by the function of the OS 10, the printer driver 30 of the client PC can access the LanguageMonitor 32, regardless of whether the LanguageMonitor 32 is in the client PC or the server PC 110. Furthermore, the render driver 39 can acquire, via the LanguageMonitor 32, the print settings that have been changed with the print dialog of the UI driver 38 after printing has started.

Therefore, the sequence diagram would be the same as FIGS. 21A and 21B. Thus, the operation of managing job IDs and print settings using the LanguageMonitor 32 can be implemented in a case of EMF spool (client side rendering) in a Point & Print environment.

Figure 27:
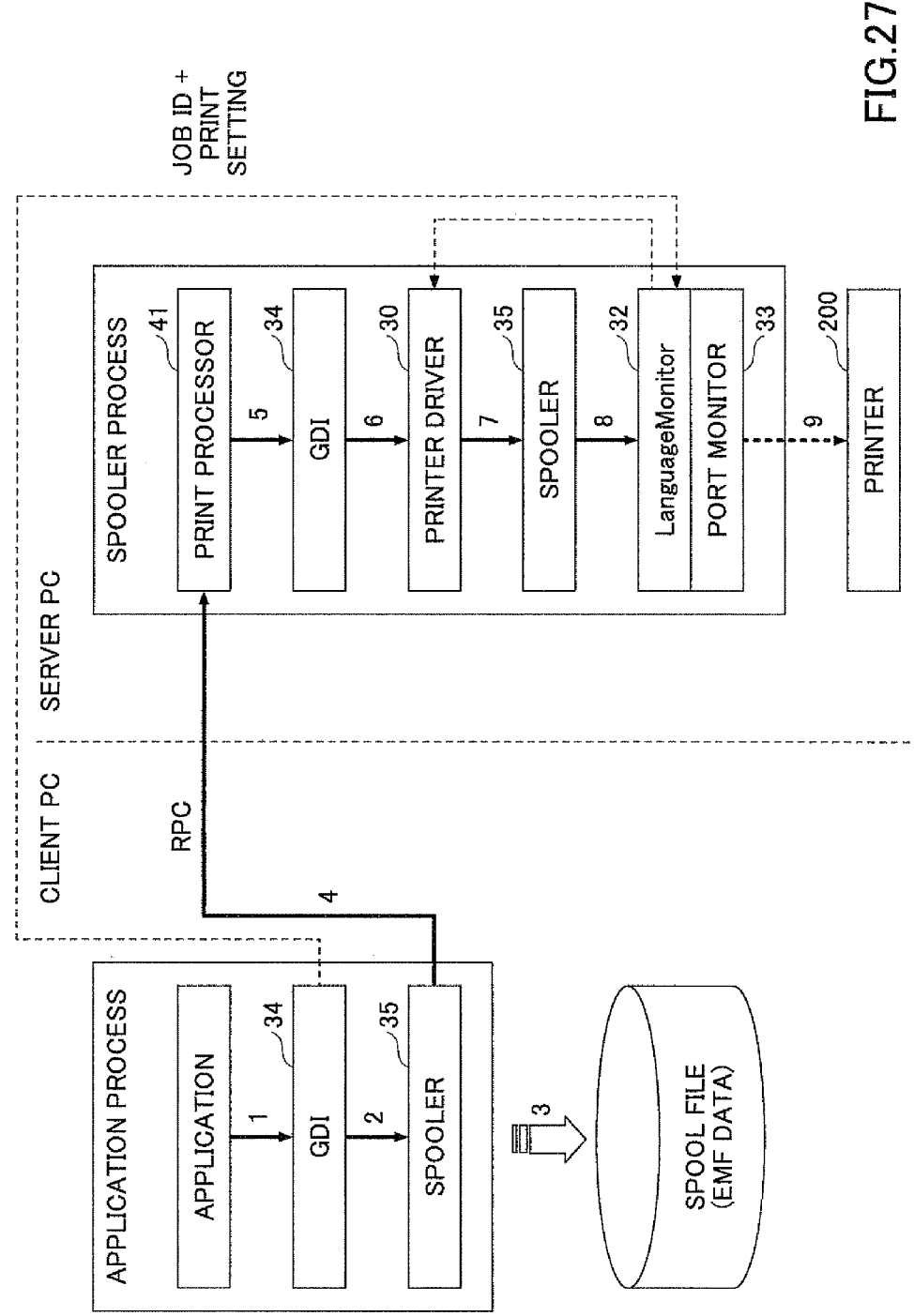
FIG. 27 schematically illustrates the printing procedures of EMF spool (server side rendering) in a Point & Print environment.

FIG. 27 schematically illustrates the printing procedures of EMF spool (server side rendering) in a Point & Print environment. In the Point & Print environment, when the user sets EMF spool, the user can select the rendering side. When server side rendering is selected, a render process (generates RAW data) is performed at the server PC 110.

(1) The application calls the GDI 34. At this time, the server PC 110 assigns a unique job ID for the server, and returns the job ID to the client PC.

(2) The GDI 34 calls the printer driver 30. The UI driver 38 of the printer driver 30 acquires a job ID from the GDI 34 by DrvDocumentEvent( ) DOCUMENTEVENT_START-DOCPOST( ). When the UI driver 38 displays a print dialog, the user can change the print setting. The UI driver 38 sets the print setting acquired form the render driver 39 by DrvEscape( ) in the LanguageMonitor 32 by SendRecv-BidiDataFromPort( )::set. The GDI 34 generates EMF data form the document data.

(3) The spooler 35 spools the print data (EMF data).

(4) The spooler 35 sends the print data (EMF data) by RPC to the server PC 110.

(5) The process shifts to the server PC 110, and the print processor 41 of the server PC 110 calls the GDI 34.

(6) The GDI 34 calls the printer driver 30.

(7) The render driver 39 of the printer driver 30 acquires the job ID by an argument of DrvStartDoc( ) from the GDI 34. Then, when printing starts in units of pages, the render driver 39 acquires print settings from the LanguageMonitor 32 by SendRecvBidiDataFromPort( )::get. The render driver 39 of the printer driver 30 creates RAW data from EMF data. The printer driver 30 spools the print data (RAW data).

(8) The spooler 35 sends print data to the LanguageMonitor 32.

(9) The LanguageMonitor 32 and the port monitor 33 send the print data to the printer. At this stage, the LanguageMonitor 32 does not perform a process.

As described above, in EMF spool also, the print procedures are the same as a case where the printer driver 30 is locally operating, except that the job ID is generated at the server PC 110. Even if the process is performed separately at the client PC and the server PC 110, by the function of the OS 10, the printer driver 30 an access the LanguageMonitor 32, regardless of whether the LanguageMonitor 32 is in the client PC or the server PC 110. Furthermore, the render driver 39 can acquire, via the LanguageMonitor 32, the print settings that have been changed with the print dialog of the UI driver 38 after printing has started.

Therefore, the sequence diagram would be the same as FIGS. 21A and 21B. Thus, the operation of managing job IDs and print settings using the LanguageMonitor 32 can be implemented in a case of EMF spool (client side rendering) in a Point & Print environment.

According to one embodiment of the present invention, an information processing apparatus is provided, which is capable of making print settings after printing has started, regardless of differences in the spool format or the install environment of the printer driver.

The information processing apparatus and system are not limited to the specific embodiments described herein, and variations and modifications may be made without departing from the scope of the present invention.

The present application is based on Japanese Priority Patent Application No. 2011-226153, filed on Oct. 13, 2011, the entire contents of which are hereby incorporated herein by reference.

What is claimed is:

1. An information processing apparatus comprising:
   an operation receiving unit configured to receive an operation;
   a setting receiving unit configured to display a setting condition for printing or transmission and to receive a change to the setting condition, after the operation receiving unit receives an instruction to start printing or to start transmission;
   an image processing unit configured to acquire, from a document data providing unit, document data that is a printing target or a transmission target, and convert the document data into print data of a printing device based on the setting condition; and
   a setting condition storage unit in which the setting condition is stored by the setting receiving unit via an operating system by using, as a key, identification information acquired by the setting receiving unit, the identification information identifying a printing process or a transmission process and being generated by the operating system according to the instruction to start printing or to start transmission, wherein
   the image processing unit acquires the identification information from the operating system, and reads, from the setting condition storage unit, the setting condition via the operating system by using the identification information as a key, and converts the document data into the print data of the printing device based on the setting condition.

2. The information processing apparatus according to claim 1, wherein
   when the setting receiving unit displays the setting condition for printing or transmission after receiving the instruction to start printing or to start transmission, the setting receiving unit calls a predetermined API function of the operating system to acquire the setting condition from the image processing unit.

3. The information processing apparatus according to claim 1, wherein
   the setting receiving unit acquires an operation result indicating execute printing or execute transmission or cancel printing or cancel transmission received by the operation receiving unit after displaying the setting condition for printing or transmission, and stores the operation result together with the setting condition in the setting condition storage unit, and
   the image processing unit cancels the conversion of the document data into the print data when the operation result read from the setting condition storage unit indicates cancel printing or cancel transmission.

4. The information processing apparatus according to claim 1, wherein
   the setting condition storage unit is a LanguageMonitor, and
   the setting receiving unit calls a predetermined API function of the operating system to store the setting condition in the LanguageMonitor by using the identification information as a key.

5. The information processing apparatus according to claim 4, wherein
   the image processing unit calls a predetermined API function of the operating system to read the setting condition from the LanguageMonitor by using the identification information as a key.

6. The information processing apparatus according to claim 1, wherein
   the operating system generates, in the information processing apparatus, a job ID as a unique item of the identification information, every time the operation receiving unit receives the instruction to start printing or to start transmission.

7. The information processing apparatus according to claim 6, wherein
   the operating system
   generates a unique item of the identification information for a printing process or a transmission process of document data provided by a different document data providing unit, generates a unique item of the identification information for a printing process or a transmission process of different document data provided by the same document data providing unit, and generates a unique item of the identification information for a different printing process or transmission process of the same document data provided by the same document data providing unit.

8. The information processing apparatus according to claim 1, wherein the setting receiving unit stores the setting condition in the setting condition storage unit by using the identification information as a key after the operation receiving unit receives the instruction to start printing or to start transmission and before the operating system generates intermediate print data that does not depend on the printing device, and after the operating system releases the document data providing unit from the printing process or the transmission process, the image processing unit called by the operating system reads the setting condition from the setting condition storage unit by using the identification information as a key.

9. A system in which a first information processing apparatus, a second information processing apparatus, and a printing device are connected via a network, the system comprising:

an operation receiving unit configured to receive an operation;

a setting receiving unit configured to display a setting condition for printing or transmission and to receive a change to the setting condition, after the operation receiving unit receives an instruction to start printing or to start transmission;

an image processing unit configured to acquire, from a document data providing unit, document data that is a printing target or a transmission target, and convert the document data into print data of the printing device based on the setting condition;

a setting condition storage unit provided in the second information processing apparatus, in which the setting condition is stored by the setting receiving unit via an operating system of the first information processing apparatus and the second information processing apparatus by using, as a key, identification information acquired by the setting receiving unit, the identification information identifying a printing process or a transmission process and being generated by the operating system of the second information processing apparatus according to the instruction to start printing or to start transmission, wherein the image processing unit acquires the identification information from the operating system of the second information processing apparatus, and reads, from the setting condition storage unit, the setting condition via the operating system of at least the second information processing apparatus by using the identification information as a key, and converts the document data into the print data of the printing device based on the setting condition.

10. The system according to claim 9, wherein the first information processing apparatus includes the operation receiving unit, the setting receiving unit, and the image processing unit, and the first information processing apparatus sends the print data to the second information processing apparatus.

11. The system according to claim 9, wherein the first information processing apparatus includes the operation receiving unit and the setting receiving unit, the second information processing apparatus includes the image processing unit, the first information processing apparatus sends, to the second information processing apparatus, intermediate print data that does not depend on the printing device converted from the document data by the operating system of the first information processing apparatus, and the image processing unit reads the setting condition from the setting condition storage unit of the second information processing apparatus by using the identification information as a key, and converts the intermediate print data into the print data of the printing device based on the setting condition.

12. A non-transitory computer-readable recording medium storing a program that causes an information processing apparatus, including an operation receiving unit for receiving an operation, to execute a method comprising:

displaying a setting condition for printing or transmission and receiving a change to the setting condition, after the operation receiving unit receives an instruction to start printing or to start transmission;

acquiring, by a setting module, identification information identifying a printing process or a transmission process and being generated by an operating system according to the instruction to start printing or to start transmission;

storing the setting condition in a setting condition storage unit via the operating system by using the identification information as a key;

acquiring, by an image processing module, the identification information from the operating system;

reading, by the image processing module, the setting condition from the setting condition storage unit via the operating system using the identification information as a key; and converting, by the image processing module, document data that is a printing target or a transmission target provided by a document data providing unit into print data of a printing device based on the setting condition read from the setting condition storage unit.

* * * * *